US011880807B2

(12) United States Patent
Balasia et al.

(10) Patent No.: US 11,880,807 B2
(45) Date of Patent: *Jan. 23, 2024

(54) SYSTEM AND METHOD FOR ONLINE INFORMATION, EMPLOYMENT, SOCIAL AND OTHER COMPATIBILITY SEARCH, MATCHING AND RANKING

(71) Applicant: Digerati, Inc., Detroit, MI (US)

(72) Inventors: Brian Balasia, Royal Oak, MI (US); Joseph Klecha, Detroit, MI (US); Robert Levy, Bloomfield Hills, MI (US); Timothy Kocoloski, Livonia, MI (US)

(73) Assignee: Digerati, Inc., Detroit, MI (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/538,089

(22) Filed: Nov. 30, 2021

(65) Prior Publication Data

US 2022/0092549 A1 Mar. 24, 2022

Related U.S. Application Data

(63) Continuation of application No. 16/679,792, filed on Nov. 11, 2019, now Pat. No. 11,227,259, which is a continuation of application No. 16/403,509, filed on May 4, 2019, now Pat. No. 10,510,045, which is a (Continued)

(51) Int. Cl.
*G06F 7/00* (2006.01)
*G06F 16/00* (2019.01)
*G06Q 10/1053* (2023.01)
*G06F 16/2457* (2019.01)
*G06F 16/9535* (2019.01)

(52) U.S. Cl.
CPC ... *G06Q 10/1053* (2013.01); *G06F 16/24578* (2019.01); *G06F 16/9535* (2019.01)

(58) Field of Classification Search
None
See application file for complete search history.

(56) References Cited

U.S. PATENT DOCUMENTS

2015/0339336 A1* 11/2015 Miller ................. G06N 5/02
707/751
2015/0379016 A1* 12/2015 Eriksson ............. G06F 16/9024
707/724

* cited by examiner

*Primary Examiner* — Tuan A Pham
(74) *Attorney, Agent, or Firm* — Nancy R. Gamburd; Gamburd Law Group LLC

(57) ABSTRACT

A computer server system and method are disclosed for personalization and customizable filtering of network search results and search result rankings, such as for Internet searching. A representative server system comprises: a network interface to receive a query from a respondent or co-respondent; at least one data storage device storing a plurality of return queries; and one or more processors adapted to access the data storage device and using the query, to select the return queries for transmission; to search the data storage device for corresponding pluralities of responses to the return queries from other co-respondents or respondents; to pair-wise score the responses and generate pair-wise alignment scores for respondent and co-respondent combinations; to sort and rank the combinations according to the alignment scores; and to output a listing of the sorted and ranked respondents or co-respondents to form the personalized network search results and search result rankings.

22 Claims, 18 Drawing Sheets

Related U.S. Application Data continuation of application No. 15/411,984, filed on Jan. 21, 2017, now Pat. No. 10,296,873.

(60) Provisional application No. 62/286,349, filed on Jan. 23, 2016.

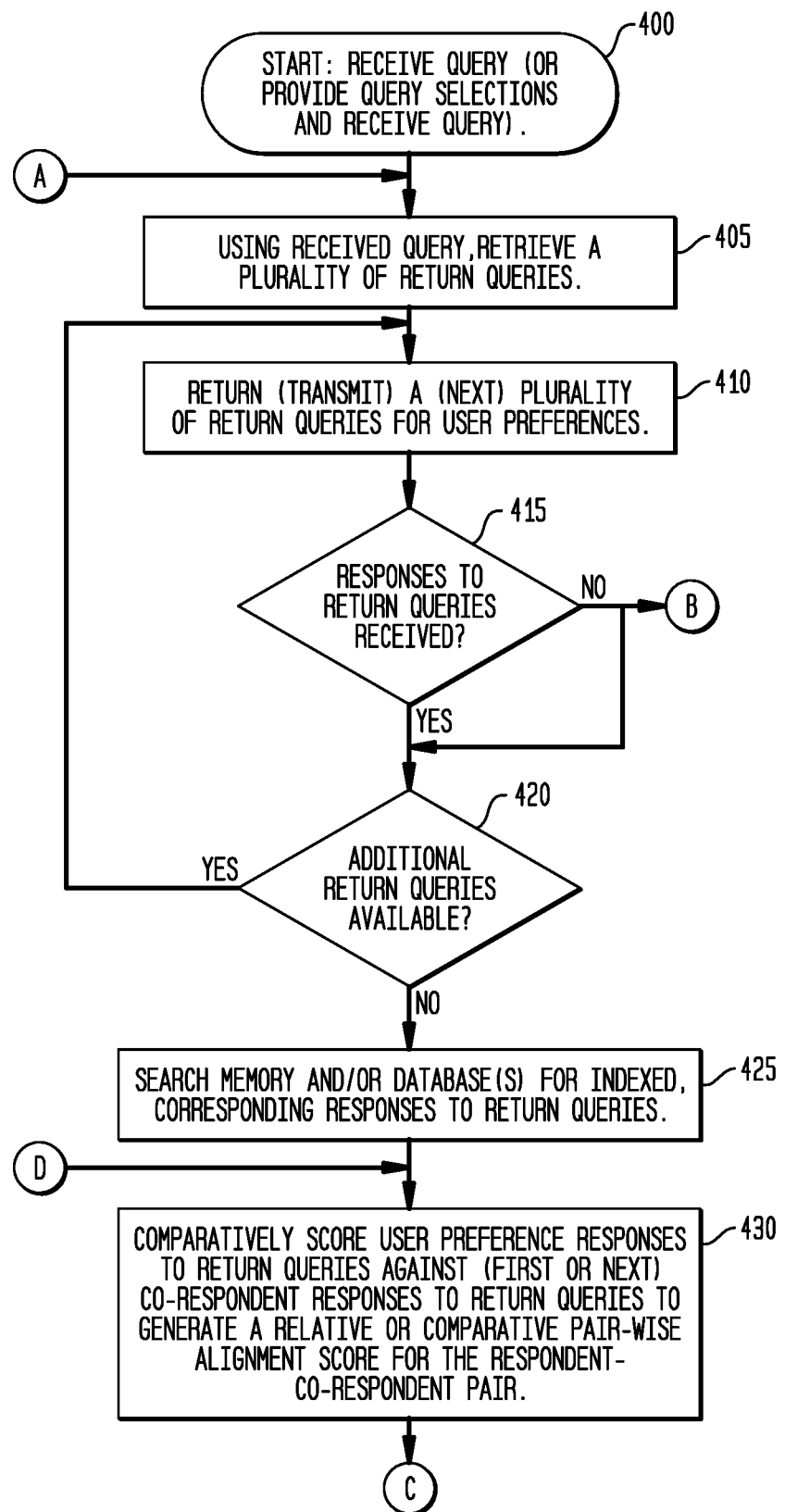

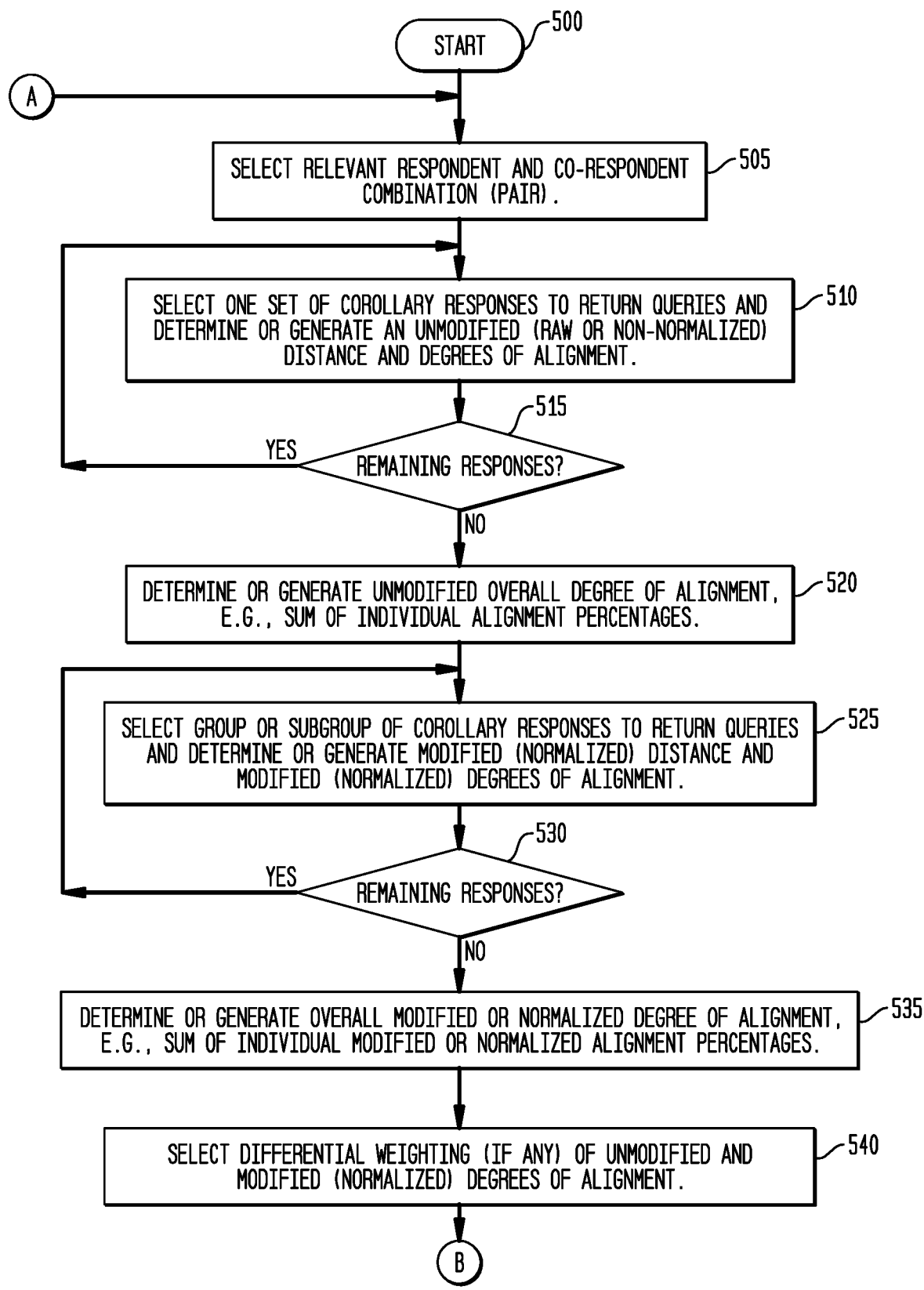

FIG. 8B workfountain

REQUIRED YEARS OF EXPERIENCE

0 — 5 — 10 — 840 15 — 20 OR MORE — 825

IS A BACHELORS DEGREE REQUIRED? — 870
875 — ⦿ YES    ○ NO

HOW MUCH TIME DO YOU EXPECT THE CANDIDATE TO SPEND DESIGNING TELECOMMUNICATIONS EQUIPMENT?

(-5) — NOT AT ALL — NOT OFTEN, IF EVER — OCCASIONALLY — 840 OFTEN — MOST OF THE TIME (+5) — 830

NEXT — 850

FIG. 9A workfountain

About Contact  MY ACCOUNT • Demo

LEARN MORE ABOUT WORKFOUNTAIN

Matches

Congratulations! Your Software Developer opportunity has been successfully published. Use your Dashboard to view all of your activity. To view your receipt, click here.

[Post New Opportunity]

Software Developer — 900
Opportunity Start Date: Feb 01 2016
Integrate this posting on any job board
Promote this opportunity via Email and Social Media:

View Opportunity Details ▷

Edit Opportunity | Candidate-Pool Demographics
Opportunity Expires in 30 days

— 910

| * | Candidate Details | Match Score | Education | Status | Next Action — 955 | Remove |
|---|---|---|---|---|---|---|
| | John Dziendziel | ★★★★☆ | University of Toledo | Matched | Request To Connect | × |
| | Dominique Caballero | ★★★★★ | University of Illinois at Springfield | Matched | Request To Connect | × |
| | Remington Draper | ★★★★★ | Williams College | Matched | Request To Connect | × |
| | Andrew Manore | ★★★★★ | University of Michigan-Dearborn | Matched | Request To Connect | × |
| | Marlene Reed | ★★★★★ | N/A | Matched | Request To Connect | × |
| | Kentrell Rabon | ★★★★☆ | Kalamazoo Valley Community College | Matched | Request To Connect | × |
| | Burritt Watrous | ★★★★☆ | Grand Valley State University | Matched | Request To Connect | × |

[ADDITIONAL CANDIDATES] — 920

Manage Opportunities
System Matches
Requests
Connections

FIG. 9B workfountain

About Contact MY ACCOUNT • Demo

LEARN MORE ABOUT WORKFOUNTAIN

- Manage Opportunities
- System Matches
- Requests
- Connections

Match Detail △ Student Profile ✎ Notes

John Dziendziel ★★★★☆
⚐ Report candidate as suspicious

English Proficiency: Native Speaker
Geographic Preferences: Central (Lansing) Michigan, Metro Detroit (Detroit) Michigan, and Northwest (Toledo) Ohio Request To Connect — 955

Education

University of Toledo

| Class/Degree Level | Major | Minor | GPA | Graduation Date |
|---|---|---|---|---|
| Bachelor's Degree | Computer Engineering | N/A | 3.306 | May 2016 |

Owens Community College

| Class/Degree Level | Major | Minor | GPA | Graduation Date |
|---|---|---|---|---|
| Associates Degree | Computer and Information Science | N/A | 3.57 | May 2012 |

Work History

Nysus Solutions

Positions: Junior Software Engineer/Co-Op
Start Date: Mar 2015
End Date: Aug 2015

950

FIG. 10
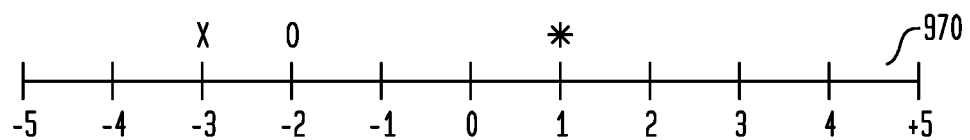
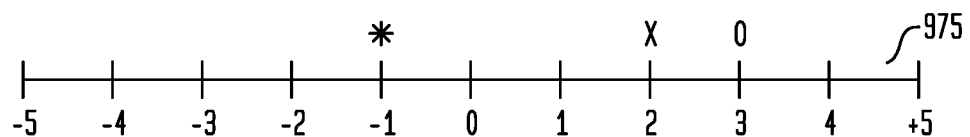
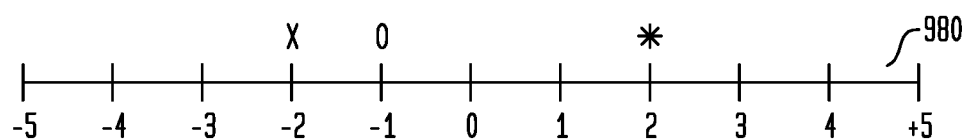

FIG. 11B $$\begin{bmatrix} 0 & 0 & 0 & 0 & & 0 \\ 0 & 1 & 0 & 0 & & 0 \\ 0 & 0 & 1 & 0 & \cdots & 0 \\ 0 & 0 & 0 & 0 & & 0 \\ 1 & 0 & 0 & 1 & & 1 \end{bmatrix} {\sim} 370$$

$\Updownarrow$ $$\begin{bmatrix} 0 & 1 & 0 & 0 & & 0 \\ 0 & 0 & 1 & 0 & & 0 \\ 0 & 0 & 0 & 0 & \cdots & 0 \\ 1 & 0 & 0 & 1 & & 1 \\ 0 & 0 & 0 & 0 & & 0 \end{bmatrix} {\sim} 360$$

FIG. 11C $$\begin{bmatrix} 4 \\ 1 \\ 2 \\ 4 \\ \vdots \\ \vdots \\ \vdots \\ 5 \end{bmatrix} 350_A \quad \begin{bmatrix} 4 \\ 1 \\ 2 \\ 4 \\ \vdots \\ \vdots \\ \vdots \\ 4 \end{bmatrix} 360_A \quad \begin{bmatrix} 5 \\ 2 \\ 3 \\ 5 \\ \vdots \\ \vdots \\ \vdots \\ 5 \end{bmatrix} 370_A$$

FIG. 11D $$\begin{bmatrix} 0 \\ 0 \\ 0 \\ 0 \\ \vdots \\ \vdots \\ 1 \end{bmatrix} 380_A$$

FIG. 11E $$\begin{bmatrix} 1 \\ 1 \\ 1 \\ 1 \\ \vdots \\ \vdots \\ 1 \end{bmatrix} 390_A$$

SYSTEM AND METHOD FOR ONLINE INFORMATION, EMPLOYMENT, SOCIAL AND OTHER COMPATIBILITY SEARCH, MATCHING AND RANKING

CROSS-REFERENCE TO RELATED APPLICATIONS

This application is a continuation of and claims priority to and the benefit of U.S. patent application Ser. No. 16/679,792, filed Nov. 11, 2019, inventors Brian Balasia et al., titled "System and Method For Online Information, Employment, Social and Other Compatibility Search, Matching and Ranking", which is a continuation of and claims priority to and the benefit of U.S. patent application Ser. No. 16/403,509, filed May 4, 2019 and issued Dec. 17, 2019 as U.S. Pat. No. 10,510,045, inventors Brian Balasia et al., titled "System and Method For Online Information, Employment, Social and Other Compatibility Search, Matching and Ranking", which is a continuation of and claims priority to and the benefit of U.S. patent application Ser. No. 15/411,984, filed Jan. 21, 2017 and issued May 21, 2019 as U.S. Pat. No. 10,296,873, inventors Brian Balasia et al., titled "System and Method For Online Information, Employment, Social and Other Compatibility Search, Matching and Ranking", which is a nonprovisional of and claims priority to and the benefit of U.S. Provisional Patent Application No. 62/286,349, filed Jan. 23, 2016, inventors Brian Balasia et al., titled "System and Method For Online Information, Employment, Social and Other Compatibility Search, Matching and Ranking", which are commonly assigned herewith, incorporated herein by reference with the same full force and effect as if set forth in their entireties herein, and with priority claimed for all commonly disclosed subject matter.

FIELD OF THE INVENTION

The present invention relates generally to online search engines, and more specifically to personalization of Internet-based information, employment, social, and other compatibility searching, matching and ranking.

BACKGROUND OF THE INVENTION

The current state of the art in online information, employment, social, and other compatibility searching, matching and ranking is highly limited. While online search engines (generally using word-based or phrase-based searching) are reasonably advanced in their ability to retrieve documents (e.g., web pages, images, files, etc.), that are responsive to the terms of a query, typically searched and retrieved using keywords contained in the query, these keyword search methods do not provide high quality results for employment opportunities or other information, employment, social, and other compatibility search, matching and ranking. While such search engines typically return results that accurately correspond to the search terms (keywords) of the query, the search results may not reflect the user's underlying interests and goals, both of which are highly significant for finding suitable, highly compatible employment opportunities or social engagements, for example.

Additionally, using such keyword searching, too many search results and an insufficient quality of the search results from may be returned by the search engine, creating several problems. First, so many results are returned that the user cannot review all of the results in a reasonable period of time, or within the time allocated for review by the user. Second, because of the large number of results, search providers typically return results which have been ranked according to some criteria applied by the search provider, such as by the Google page ranking system based upon the number of links to a selected web page (or website) provided by third parties as an indicator of the importance of the selected web page (or website).

In many cases, the ranked search results are distorted, both by being over-inclusive in the results returned, and by distortion of the rankings of the results. For example, keyword searching can be "gamed", with websites or documents including various keywords simply to be included in ranked results, resulting in over-inclusion of these otherwise irrelevant websites or documents in the search results. Also for example, keywords can be purchased from a search provider, often through a daily bidding process, resulting in distorted search result rankings, with the highest rankings in the search results going to the highest bidder.

Not only does this result in overall inaccuracy of the results returned, but also it increases the amount of data which must be transmitted to the user, much of which is irrelevant and which serves to obscure or bury the relevant data sought by the user of the search engine, essentially hiding the relevant "needle" in the irrelevant "haystack". The increased amount of transmitted data also tends to require larger databases for data storage, larger system server and memory requirements, and further serves to overload various network and Internet systems and effectively increase the overall search time.

In addition, this type of Internet searching may also be under-inclusive, missing the most relevant information which may not utilize the particular keyword and failing to return relevant results.

These problems of over-inclusiveness, under-inclusiveness and distorted rankings creates additional problems in many industries, particularly employment, and are further compounded by aggregator websites. For example, many employment search or job posting websites simply aggregate job postings and job advertisements from many other sites and locations, and do not provide any mechanism to find or locate the most relevant employment opportunities or candidates. For example, in employment searching, resumes are often created to using typical search keywords, so that an applicant's name and resume will be in the search results returned in a keyword search by a potential employer. The end results are that an individual's resume is submitted to hundreds of companies, with the corollary result that a company may receive thousands to hundreds of thousands of resumes for job postings which cannot be effectively winnowed or reduced through additional keyword searching, and again means that the recruiter (such as a potential employer) cannot review all of the resume results in a reasonable period of time, or within the time allocated for review by the employer (e.g., the time interval between receipt of the search results and when the applicant would be expected to interview and start employment). For example, so many resumes may be received which would require hundreds of person-hours to review, while only several (e.g., 2-3) person-hours may be allocated to review the submitted resumes, making a thorough review effectively impossible.

As a further result, search results returned in these over-inclusive situations do not provide fully actionable information. For example, when faced with a thousand resumes for a job posting, a potential employer may simply pick several which are literally at the top of the stack, such as a stack of resumes ordered based on the time each was received (if at all), or may pick a candidate based on an uneducated referral (such as from a relative, friend, or coworker), potentially overlooking many more qualified candidates. In addition, the end result for a job applicant may be multiple and undesired inquiries from potential employers offering jobs for which the applicant has no interest. These poor search results have associated costs, both in the time and effort spent searching, and in employee turnover.

A need remains, therefore, for a system and method for personalization of Internet-based employment search results and employment search result ranking, such as for online employment compatibility search, matching and ranking, using a search engine. A need also remains for a system and method for customizable filtering of Internet-based search results and search result ranking in a search engine. Such a search engine system and method should provide an alternative to keyword searching, and should produce actionable results, such as returning a reasonable number of employment search results of high quality, that are directly relevant to the personalized search and without being under-inclusive, and further which can be reviewed by the user within the user's time allocation. Such a search engine should also result in a decrease in the amount of data required to be stored and decrease the corresponding size of the resulting databases, further serving to decrease the amount of data required to be transmitted and reduce the system load. In addition, such a search engine system and method should incorporate time sensitivity in the personalized search results and provide corresponding user notifications.

SUMMARY OF THE INVENTION

The representative or exemplary embodiments of the present invention provide numerous advantages. Representative embodiments provide for a technical, artificial intelligence solution to an Internet-centric problem of over-inclusiveness of search results, under-inclusiveness of relevant information, and distorted rankings of search results using the prior art keyword searching. The representative embodiments automate the Internet-based searching and selection processes using highly relevant, user-determined characteristics and user-customizable parameters, resulting in personalization of search results and search result ranking. The representative embodiments further automate the Internet-based searching and selection processes using highly relevant, user-determined and centrally-located filters, also resulting in personalization of search results and search result ranking. The representative embodiments employ artificial intelligence to "match" information to a user (as a respondent or co-respondent) and provide exactly the information the user wants or needs (if available) at the point in time wanted or needed, without inundating the user with thousands of responses or documents which the user cannot possibly review in a reasonable or allocated time, and without being under-inclusive of highly relevant search results.

As a result, the representative embodiments improve the functioning of Internet-based searches, providing highly personalized search results and search result rankings, thereby dramatically decreasing the amount of search time required for a user to discover relevant and actionable information.

As a further result, the representative embodiments improve the functioning of Internet-based searches, decreasing the amount of data which must be transmitted to provide the highly personalized search results and search result rankings, decreasing the size of the databases required for data storage, decreasing the system server and memory requirements, and further serving to decrease the load of the various system components, such as the Internet-based servers and routers.

A representative embodiment provides computer server system coupleable to a network for personalization of network search results and search result rankings. A representative server system comprises: a network input and output interface for network data transmission and reception, the network input and output interface adapted to receive at least one query from a respondent or co-respondent via the network; to transmit a plurality of return queries to the respondent or co-respondent via the network; to receive a plurality of responses to the return queries from the respondent or co-respondent via the network; and to transmit personalized network search results and search result rankings to the respondent or co-respondent via the network; at least one data storage device storing a plurality of return queries; and one or more processors coupled to the at least one data storage device and network input and output interface, the one or more processors adapted to access the at least one data storage device and using the at least one query, to select the plurality of return queries for transmission; to search the at least one data storage device for corresponding pluralities of responses to the return queries from one or more co-respondents or respondents, respectively; to comparatively pair-wise score the plurality of responses to the return queries against the corresponding pluralities of responses to the return queries and generate a plurality of pair-wise alignment scores for a plurality of respondent and co-respondent combinations; to sort and rank the plurality of respondent and co-respondent combinations according to the plurality of pair-wise alignment scores; and to output a listing of the sorted and ranked respondents or co-respondents to form the personalized network search results and search result rankings.

In a representative embodiment, the one or more processors are further adapted to select one or more co-respondents or respondents from the sorted and ranked plurality of respondent and co-respondent combinations for inclusion of a predetermined number of sorted and ranked respondents or co-respondents to form the personalized network search results and search result rankings.

In a representative embodiment, the one or more processors may be further adapted, for each response of the plurality of responses to the return queries, to determine an unmodified distance between responses of a respondent and a co-respondent; and to combine a plurality of unmodified distance determinations for the plurality of responses to the return queries to form an unmodified alignment score. In such a representative embodiment, the one or more processors may be further adapted, for each response of the plurality of responses to the return queries, to determine a normalized distance between responses of a respondent and a co-respondent; and to combine a plurality of normalized distance determinations for the plurality of responses to the return queries to form a normalized alignment score. Also in such a representative embodiment, the one or more processors may be further adapted to differentially weight the unmodified alignment score and normalized alignment score; and to combine the differentially weighted unmodified alignment score and normalized alignment score to form the pair-wise alignment score.

In a representative embodiment, the one or more processors may be further adapted to generate a digital filter from each plurality of responses to the return queries to form a plurality of digital filters. For example, each digital filter of the plurality of digital filters may comprise a matrix or vector having the pluralities of responses to the return queries for a selected respondent or co-respondent.

In a representative embodiment, the one or more processors may be further adapted to compare a selected combination of respondent and co-respondent digital filters, of the plurality of digital filters, to generate the pair-wise alignment score for the selected respondent and co-respondent combination. For example, the comparison may be a variance determination or a difference determination.

In a representative embodiment, the one or more processors may be further adapted to use the received query as an index into the at least one data storage device.

In another representative embodiment, the one or more processors may be further adapted to store the plurality of pair-wise alignment scores for the plurality of respondent and co-respondent combinations in the at least one data storage device. In a representative embodiment, the one or more processors are further adapted to store the listing of the sorted and ranked respondents or co-respondents in the at least one data storage device.

In another representative embodiment, the one or more processors may be further adapted to generate a push notification of the personalized network search results and search result rankings for transmission by the network input and output interface to the respondent or co-respondent.

In a representative embodiment, the one or more processors may be further adapted to additionally filter the listing of the sorted and ranked respondents or co-respondents using a user-selectable parameter of a plurality of user-selectable parameters. For example, the plurality of user-selectable parameters may comprise at least one parameter selected from the group consisting of: previous employer, current employer, previous employee, current employee, citizenship, disability status, visa status, and military service.

In a representative embodiment, the respondent may be an employment candidate and the co-respondent may be a potential employer, and wherein the listing of the sorted and ranked respondents or co-respondents comprises a listing of sorted and ranked employment candidates provided to the potential employer or comprises a listing of sorted and ranked potential employers provided to the employment candidate.

In a representative embodiment, each return query a first plurality of return queries to the respondent is a corollary to each return query of a second plurality of return queries to the co-respondent. In another representative embodiment, each return query of the plurality of return queries may pertain to a characteristic of the at least one query. For example, each return query of the plurality of return queries to a respondent may pertain to a preference or interest level of one or more characteristics of the at least one query. Also for example, each return query of the plurality of return queries to a co-respondent may pertain to an expected amount of time for engaging in one or more activities related to the at least one query.

In another representative embodiment, the computer server system may further comprise: a client device coupled to the network for selection of the at least one query from a drop down menu provided on a graphical user interface.

In a representative embodiment, the at least one query may be an employment position. In another representative embodiment, the at least one query may be a social matching request.

A computer server-implemented method for personalization of network search results and search result rankings is also disclosed. A representative method may comprise: using the computer server, receiving at least one query from a respondent or co-respondent via the network; in response to the at least one query, using the computer server, accessing at least one data storage device and selecting a plurality of return queries; using the computer server, transmitting the plurality of return queries to the respondent or co-respondent via the network; using the computer server, receiving a plurality of responses to the return queries from the respondent or co-respondent via the network; using the computer server, searching the at least one data storage device for corresponding pluralities of responses to the return queries from one or more co-respondents or respondents, respectively; using the computer server, comparatively pair-wise scoring the plurality of responses to the return queries against the corresponding pluralities of responses to the return queries and generating a plurality of pair-wise alignment scores for a plurality of respondent and co-respondent combinations; using the computer server, sorting and ranking the plurality of respondent and co-respondent combinations according to the plurality of pair-wise alignment scores; and using the computer server, outputting a listing of the sorted and ranked respondents or co-respondents to form the personalized network search results and search result rankings.

In a representative embodiment, the computer server-implemented method may further comprise: using the computer server, selecting one or more co-respondents or respondents from the sorted and ranked plurality of respondent and co-respondent combinations for inclusion of a predetermined number of sorted and ranked respondents or co-respondents to form the personalized network search results and search result rankings.

In a representative embodiment, the pair-wise scoring may further comprise: for each response of the plurality of responses to the return queries, using the computer server, determining an unmodified distance between responses of a respondent and a co-respondent; and using the computer server, combining a plurality of unmodified distance determinations for the plurality of responses to the return queries to form an unmodified alignment score. In such a representative embodiment, the pair-wise scoring may further comprise: for each response of the plurality of responses to the return queries, using the computer server, determining a normalized distance between responses of a respondent and a co-respondent; and using the computer server, combining a plurality of normalized distance determinations for the plurality of responses to the return queries to form a normalized alignment score. Also in such a representative embodiment, the pair-wise scoring may further comprise: using the computer server, differentially weighting the unmodified alignment score and normalized alignment score; and using the computer server, combining the differentially weighted unmodified alignment score and normalized alignment score to form the pair-wise alignment score.

In a representative embodiment, the computer server-implemented method may further comprise: using the computer server, generating a digital filter from each plurality of responses to the return queries to form a plurality of digital filters. For example, each digital filter of the plurality of digital filters may comprise a matrix or vector having the pluralities of responses to the return queries for a selected respondent or co-respondent.

In a representative embodiment, the computer server-implemented method may further comprise: using the computer server, comparing a selected combination of respondent and co-respondent digital filters, of the plurality of digital filters, to generate the pair-wise alignment score for the selected respondent and co-respondent combination. For example, in a representative embodiment, the comparison may be a variance determination or a difference determination.

In a representative embodiment, the one or more processors may be further adapted to use the plurality of digital filters to provide a two-stage filtering of potential search results through both a respondent digital filter of a selected respondent and a co-respondent digital filter of a selected co-respondent, of the plurality of digital filters, to generate the personalized network search results and search result rankings for the selected respondent or the selected co-respondent.

In a representative embodiment, the selection of the plurality of return queries may further comprise: using the computer server, using the received query as an index into the at least one data storage device.

In a representative embodiment, the computer server-implemented method may further comprise: using the computer server, storing the plurality of pair-wise alignment scores for the plurality of respondent and co-respondent combinations in the at least one data storage device. In a representative embodiment, the computer server-implemented method may further comprise: using the computer server, storing the listing of the sorted and ranked respondents or co-respondents in the at least one data storage device.

In another representative embodiment, the computer server-implemented method may further comprise: using the computer server, generating and transmitting a push notification of the personalized network search results and search result rankings to the respondent or co-respondent.

In yet another representative embodiment, the computer server-implemented method may further comprise: using the computer server, filtering the listing of the sorted and ranked respondents or co-respondents using a user-selectable parameter of a plurality of user-selectable parameters. For example, the plurality of user-selectable parameters comprises at least one parameter selected from the group consisting of: previous employer, current employer, previous employee, current employee, citizenship, disability status, visa status, and military service.

In a representative embodiment, the computer server-implemented method may further comprise: selecting the at least one query from a drop down menu provided on a graphical user interface.

A representative embodiment provides computer server system coupleable to a network for personalization of network search results and search result rankings. A representative server system comprises: a network input and output interface for network data transmission and reception, the network input and output interface adapted to receive at least one query from a respondent or co-respondent via the network; to transmit a plurality of return queries to the respondent or co-respondent via the network; to receive a plurality of responses to the return queries from the respondent or co-respondent via the network; to transmit personalized network search results and search result rankings to the respondent or co-respondent via the network; and to transmit a push notification of the personalized network search results and search result rankings to the respondent or co-respondent via the network; at least one data storage device storing a plurality of return queries; and one or more processors coupled to the at least one data storage device and network input and output interface, the one or more processors adapted to access the at least one data storage device and using the at least one query, to select the plurality of return queries for transmission; to search the at least one data storage device for corresponding pluralities of responses to the return queries from one or more co-respondents or respondents, respectively; to comparatively pair-wise score the plurality of responses to the return queries against the corresponding pluralities of responses to the return queries using differentially weighted unmodified alignment scores and normalized alignment scores and generate a plurality of pair-wise alignment scores for a plurality of respondent and co-respondent combinations; to sort and rank the plurality of respondent and co-respondent combinations according to the plurality of pair-wise alignment scores; to output a listing of the sorted and ranked respondents or co-respondents to form the personalized network search results and search result rankings; and to generate the push notification of the personalized network search results and search result rankings to the respondent or co-respondent.

Another representative embodiment provides computer server system coupleable to a network for personalization of network search results and search result rankings. A representative server system comprises: a network input and output interface for network data transmission and reception, the network input and output interface adapted to receive at least one query from an employment candidate as a respondent or a potential employer as a co-respondent via the network, the at least one query pertaining to an employment position; to transmit a plurality of return queries to the respondent or co-respondent via the network; to receive a plurality of responses to the return queries from the respondent or co-respondent via the network; and to transmit personalized network employment search results and search result rankings to the respondent or co-respondent via the network; at least one data storage device storing a plurality of return queries; and one or more processors coupled to the at least one data storage device and network input and output interface, the one or more processors adapted to access the at least one data storage device and using the at least one query, to select the plurality of return queries pertaining to a characteristic of the employment position for transmission; to search the at least one data storage device for corresponding pluralities of responses to the return queries from one or more co-respondents or respondents, respectively; to comparatively pair-wise score the plurality of responses to the return queries against the corresponding pluralities of responses to the return queries and generate a plurality of pair-wise alignment scores for a plurality of respondent and co-respondent combinations; to sort and rank the plurality of respondent and co-respondent combinations according to the plurality of pair-wise alignment scores; and to output a listing of the sorted and ranked respondents or co-respondents to form the personalized network employment search results and search result rankings.

A computer server-implemented method for personalization of Internet-based employment search results and search result rankings is also disclosed. A representative method comprises: using the computer server, receiving at least one query from an employment candidate as respondent or a potential employer as a co-respondent via the network, the at least one query pertaining to an employment position; in response to the at least one query, using the computer server, accessing at least one data storage device and selecting a plurality of return queries pertaining to a characteristic of the employment position; using the computer server, transmitting the plurality of return queries to the respondent or co-respondent via the network; using the computer server, receiving a plurality of responses to the return queries from the respondent or co-respondent via the network; using the computer server, searching the at least one data storage device for corresponding pluralities of responses to the return queries from one or more co-respondents or respondents, respectively; using the computer server, comparatively pair-wise scoring the plurality of responses to the return queries against the corresponding pluralities of responses to the return queries and generating a plurality of pair-wise alignment scores for a plurality of respondent and co-respondent combinations; using the computer server, sorting and ranking the plurality of respondent and co-respondent combinations according to the plurality of pair-wise alignment scores; using the computer server, selecting one or more co-respondents or respondents from the sorted and ranked plurality of respondent and co-respondent combinations; and using the computer server, outputting a listing of the sorted and ranked respondents or co-respondents to form the personalized network employment search results and search result rankings.

In a representative embodiment, the listing of the sorted and ranked respondents or co-respondents may comprise a listing of sorted and ranked employment candidates provided to the potential employer or comprises a listing of sorted and ranked potential employers provided to the employment candidate.

Another representative embodiment provides computer server system coupleable to a network for personalization of network search results and search result rankings. A representative server system comprises: a network input and output interface for network data transmission and reception, the network input and output interface adapted to receive at least one query from an employment candidate as a respondent or a potential employer as a co-respondent via the network, the at least one query pertaining to an employment position; to transmit a plurality of return queries to the respondent or co-respondent via the network; to receive a plurality of responses to the return queries from the respondent or co-respondent via the network; to transmit personalized network employment search results and search result rankings to the respondent or co-respondent via the network; and to transmit a push notification of the personalized network employment search results and search result rankings to the respondent or co-respondent via the network; at least one data storage device storing a plurality of return queries; and one or more processors coupled to the at least one data storage device and network input and output interface, the one or more processors adapted to access the at least one data storage device and using the at least one query, to select the plurality of return queries pertaining to a characteristic of the employment position for transmission; to search the at least one data storage device for corresponding pluralities of responses to the return queries from one or more co-respondents or respondents, respectively; to comparatively pair-wise score the plurality of responses to the return queries against the corresponding pluralities of responses to the return queries using differentially weighted unmodified alignment scores and normalized alignment scores and generate a plurality of pair-wise alignment scores for a plurality of respondent and co-respondent combinations; to sort and rank the plurality of respondent and co-respondent combinations according to the plurality of pair-wise alignment scores; to output a listing of the sorted and ranked respondents or co-respondents to form the personalized network employment search results and search result rankings; and to generate the push notification of the personalized network employment search results and search result rankings to the respondent or co-respondent.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 4A and 4B (collectively referred to as FIG. 4) is a flow diagram illustrating an exemplary or representative method embodiment for personalization of search results and search result ranking in a search engine.

FIGS. 5A and 5B (collectively referred to as FIG. 5) is a flow diagram illustrating an exemplary or representative method embodiment for pair-wise alignment score determination for personalization of search results and search result ranking in a search engine.

FIGS. 8A and 8B (collectively referred to as FIG. 8) are paired respondent and co-respondent diagrams illustrating exemplary or representative graphical user interfaces illustrating representative return queries providing user-selectable parameters for pair-wise score determination for personalization of search results and search result ranking in a search engine.

FIGS. 9A and 9B (collectively referred to as FIG. 9) are sequences of diagrams illustrating exemplary or representative graphical user interfaces, respectively, for output of personalized search results and search result ranking, and for follow on communications.

FIG. 10 is a diagram illustrating exemplary or representative responses of respondents and co-respondents to return queries for pair-wise score determination for personalization of search results and search result ranking in a search engine.

FIGS. 11A, 11B, 11C, 11D and 11E (collectively referred to as FIG. 11) are diagrams illustrating respondent and co-respondent customized digital filters, represented both as matrices (FIGS. 11A, 11B) and vectors (FIG. 11C), and with corresponding difference vectors (FIGS. 11D and 11E).

DETAILED DESCRIPTION OF REPRESENTATIVE EMBODIMENTS

Figure 1:
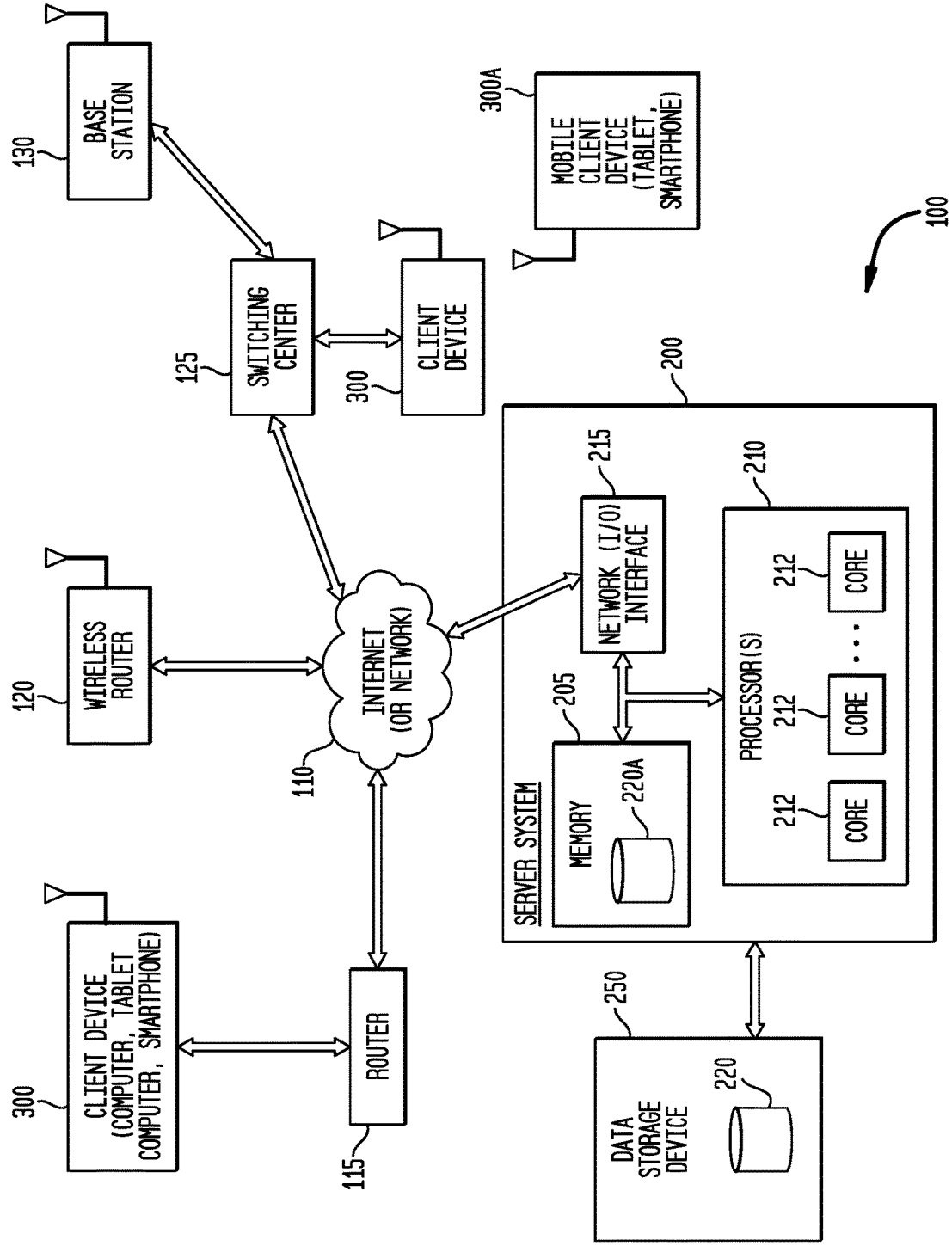
FIG. 1 is a block diagram illustrating an exemplary or representative system embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

As described in greater detail below, the representative embodiments provide a technical, artificial intelligence solution to an Internet-centric problem of over-inclusiveness of search results and distorted rankings of search results using the prior art keyword searching. Just as a computing system uses sensor information and reverse-Bayesian computations to enable driving an automobile without human control, the representative embodiments automate the Internet-based searching and selection processes using highly relevant, user-determined characteristics and user-customizable parameters, resulting in personalization of search results, customized filtering and search result ranking. Stated another way, the representative embodiments employ artificial intelligence, search personalization, and customized search filtering to "match" information to a user (as a respondent or co-respondent) and provide the relevant and ranked information the user wants or needs (if available) at the point in time wanted or needed, without inundating the user with thousands of responses or documents which the user cannot possibly review in a reasonable or allocated time.

In addition, the user-determined characteristics, user-customizable parameters, and customized filtering are stored in one or more memory storage devices of the representative embodiments and persist over a predetermined period of time, such as several months. As a result, the user-determined characteristics, user-customizable parameters, and customized filtering can be utilized repeatedly and periodically (e.g., every time a user logs in to the representative system embodiments and/or when searches are run periodically or at regular intervals by the representative system embodiments).

The personalized search results and search result rankings can then be "pushed" to the user at these periodic or regular intervals, or when the user has been included in personalized network search results and search result rankings for another respondent or co-respondent, in addition to when requested by the user, providing corresponding user notifications which are especially significant for time-sensitive information. For example, a push notification of a potential employment opportunity may be sent via SMS or text to a user's smartphone or other device, causing a messaging application to open on the smartphone or other device, and displaying an Internet link for the user to access for learning greater details about the information provided in the push notification. Also for example, a push notification of a potential employment opportunity may be sent via any applicable communication method to a user's smartphone or other device, triggering or otherwise causing a dedicated application to open on the smartphone or other device, which then displays the details about the information provided in the push notification, and further which provides various mechanisms for the user to "lock" or "pin" the information, such as using a Request to Connect button 955 provided on a GUI 950 of the dedicated application, as described in greater detail below, allowing an effectively immediate user response to highly time-sensitive information of the push notification.

Another representative embodiment provides a highly new and novel two-stage filtering to generate personalized network search results and search result rankings for a user. One (first) stage of the filtering is user-customizable, based upon the (first) user's responses to return queries 615, 620, as discussed in greater detail below. The second stage of filtering, however, is customizable by a third party, namely, another, second user, as a respondent or co-respondent, whose information may or may not be returned to the (first) user in the first user's personalized network search results and search result rankings, depending upon the alignment between the first user's digital filter and the third party, second user's digital filter.

As described in greater detail below, the representative embodiments improve the functioning of Internet-based searches, providing highly personalized search results, search filtering, and search result rankings, thereby dramatically decreasing the amount of search time required for a user to discover relevant and actionable information. Such representative embodiments also result in a decrease in the amount of data required to be stored and decrease the corresponding size of the resulting databases, further serving to decrease the amount of data required to be transmitted and reduce the system load. In addition, representative embodiments incorporate time sensitivity in the personalized search results and provide corresponding user notifications.

Figure 2:
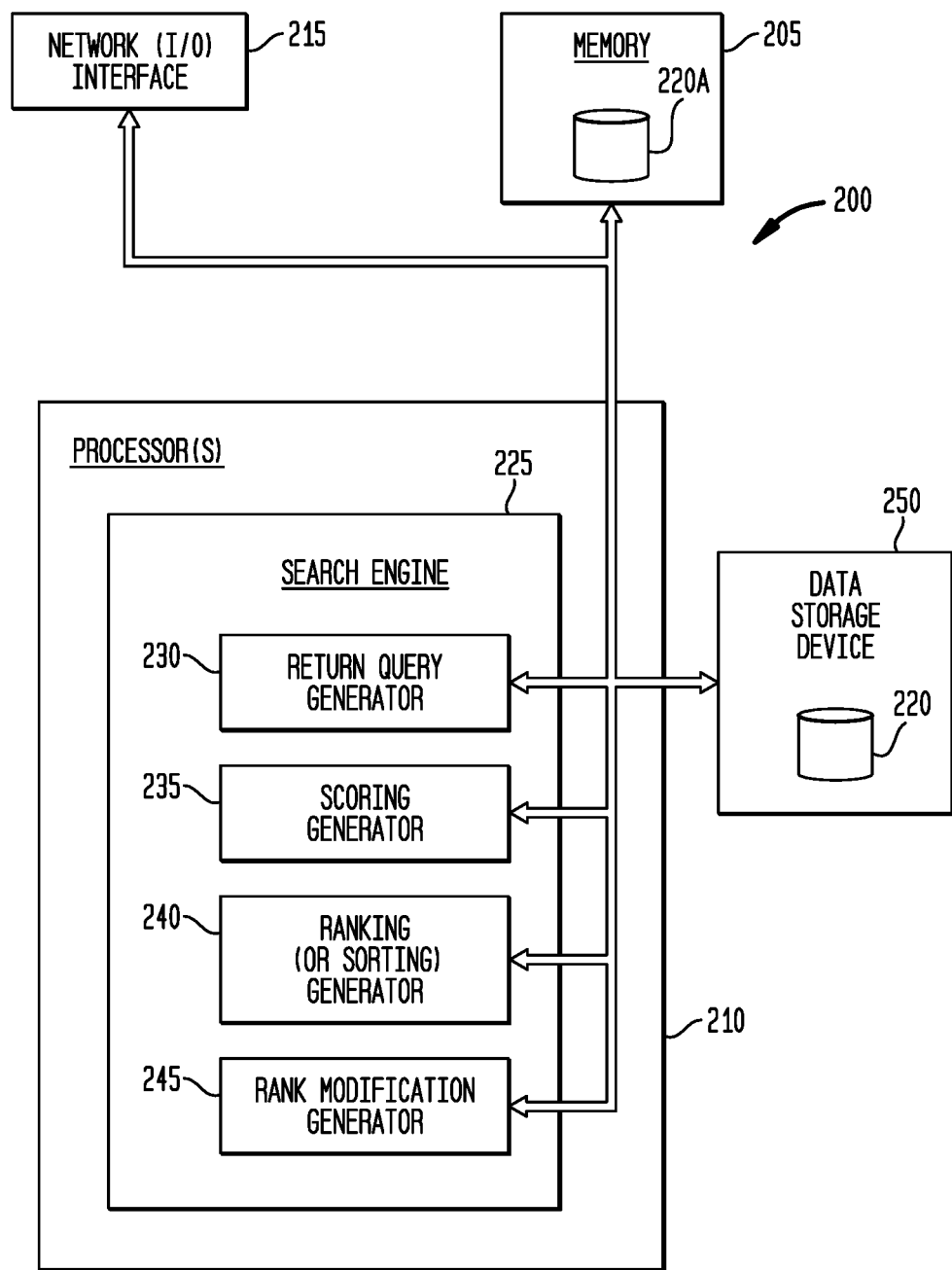
FIG. 2 is a block diagram illustrating an exemplary or representative server system or apparatus embodiment.
Figure 3:
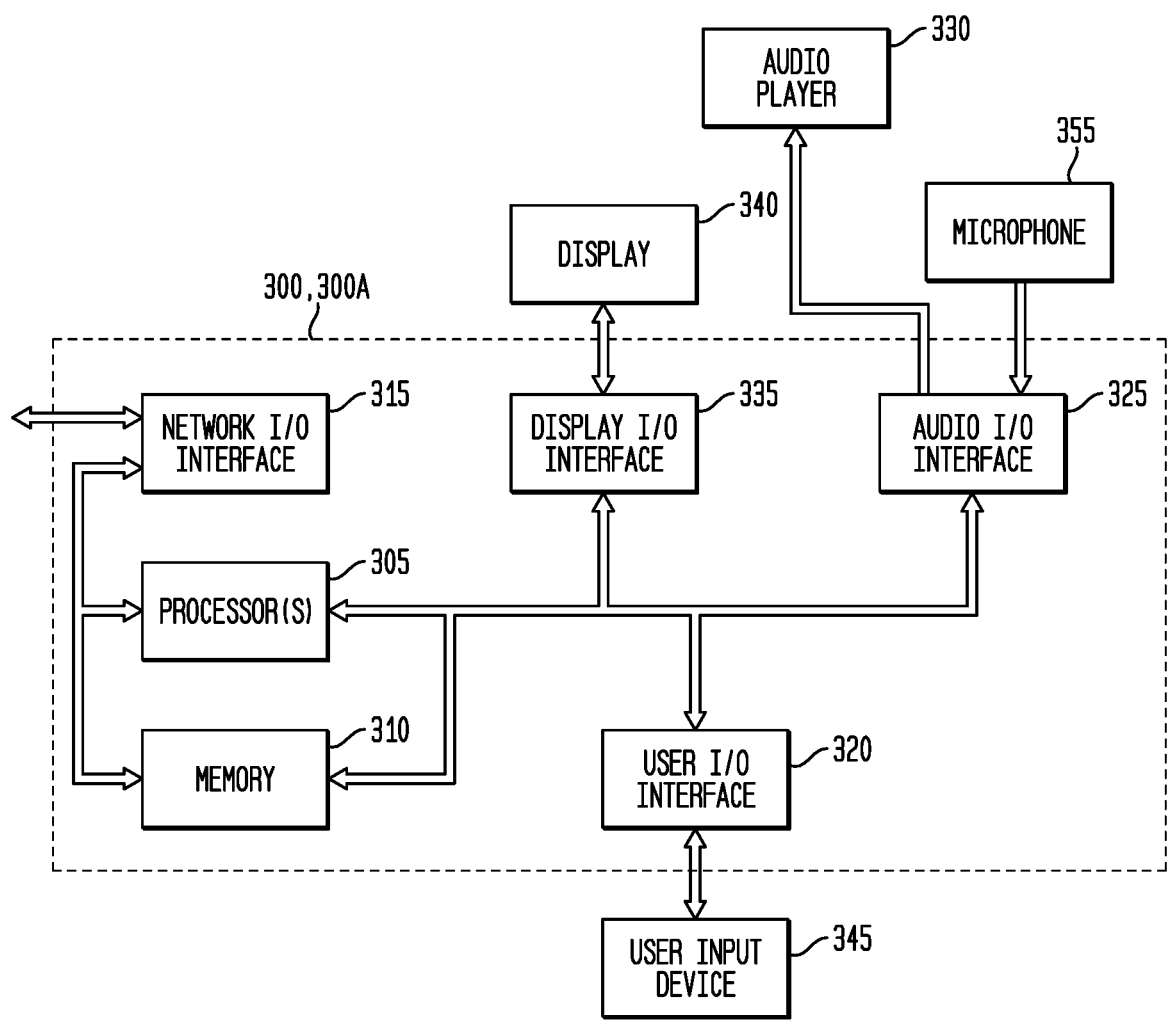
FIG. 3 is a block diagram illustrating an exemplary or representative client device embodiment.

FIG. 1 is a block diagram illustrating an exemplary or representative search system 100 for personalization of search results and search result ranking in a search engine. FIG. 2 is a block diagram illustrating an exemplary or representative (Internet-based or "cloud" based) server system (equivalently referred to as a computer server) or apparatus 200 for personalization of search results and search result ranking in a search engine, typically utilized in the search system 100. FIG. 3 is a block diagram illustrating an exemplary or representative client device 300. The system 100 is an example of an information retrieval system in which the systems, components and techniques described below can be implemented. Although several components are illustrated, there may be fewer or more components in the system 100. Moreover, the components can be distributed on one or more computing devices connected by one or more networks or other suitable communication mediums.

Referring to FIGS. 1-3, as illustrated, the exemplary search system 100 comprises at least one computer server system or apparatus 200 coupled through a network 110 (such as the Internet) (along with other network equipment and various components such as a router 115, a wireless router 120, a switching center 125 and/or base station 130) to a plurality of client devices 300, 300A. A user can interact with the search system 100 through one or more client devices 300, 300A. Representative client devices 300, 300A include, for example and without limitation, a computer, a supercomputer, a personal computer, an engineering workstation, a mainframe computer, a tablet computing device, a mobile telephone or smartphone, or any other type of data processing device. For example, the client device 300, 300A can be a computer terminal within a local area network (LAN) or wide area network (WAN).

Continuing to refer to FIG. 1, as illustrated, the exemplary network 110 may be of any type of kind, using any medium such as wired, optical, or wireless, using any current or future protocols, such as Internet Protocol ("IP"), Transmission Control Protocol ("TCP") (collectively with IP referred to as "TCP/IP"), which may further incorporate other current or future protocols, such as hypertext transfer protocol ("HTTP"), various email and file transfer protocols (e.g., SMTP, FTP), or other types of networks, such as the public switched telephone network ("PSTN"), cellular, LTE, GSM, EDGE, GPRS, Institute of Electrical and Electronic Engineers ("IEEE") 802.11, CDMA, WCDMA, or 3G, or any other network which provides for communication for data, voice or multimedia, for user input, selection, evaluation, reporting, media provision, and so on. The network 110, in turn, may be utilized to provide any type of communication between and among the at least one computer server system or apparatus 200, the client devices 300, 300A, and any of the other illustrated devices, and may be directly or indirectly coupled to any of a plurality of such devices for such Internet, voice, multimedia or any other form of data communication, whether switched or routed, including without limitation router(s) 115, wireless router(s) 120, and server(s) 200 of any type or kind (and which may be further coupled to one or more database(s) 220, such as stored in a data storage device 250), switching center(s) 125 (including mobile switching centers), and wireless base station(s) 130, such as for communication to a mobile or cellular client device 300, 300A. For example, the network 110 may be the Internet, or a public or private LAN or WAN.

Figure 6:
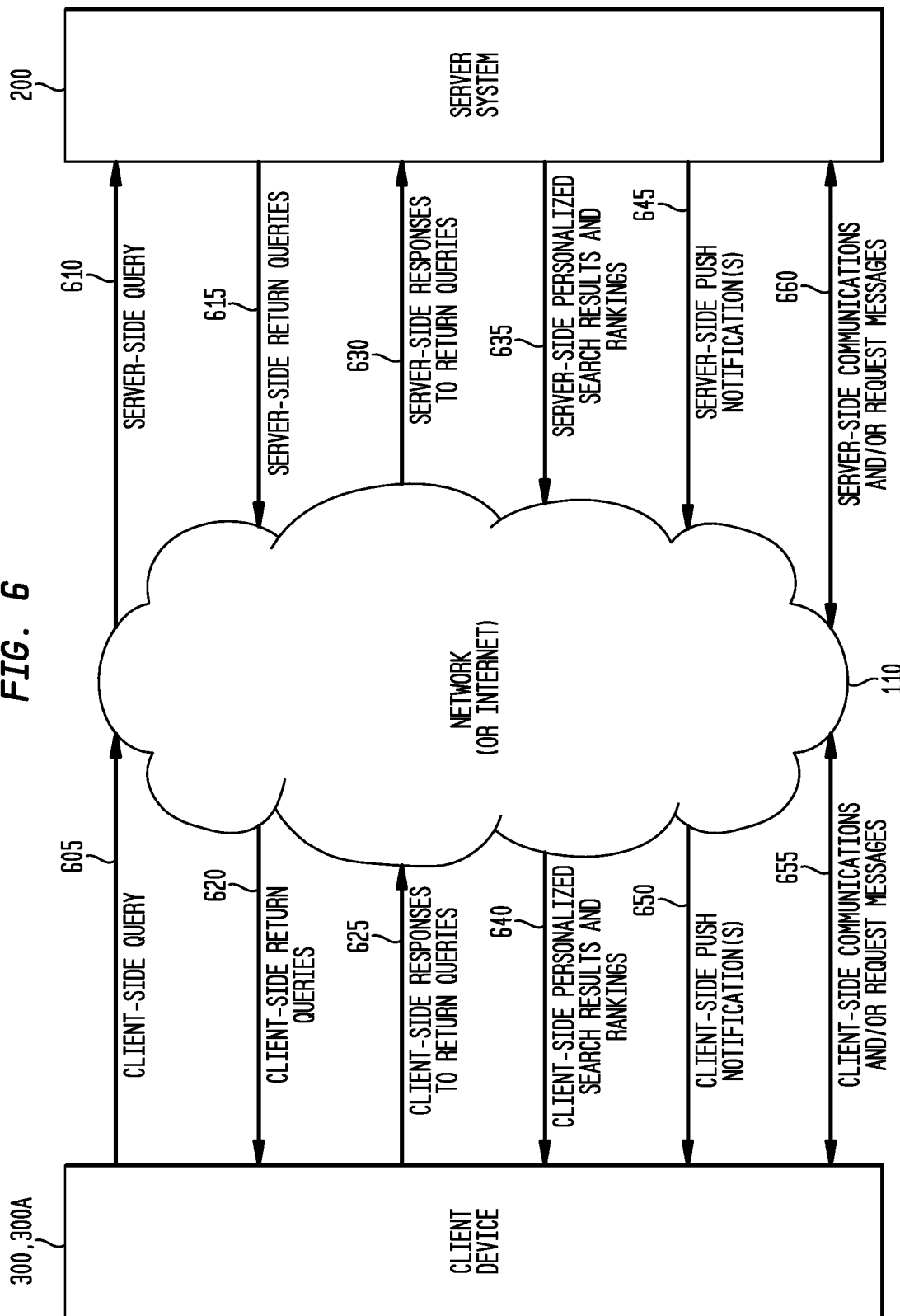
FIG. 6 is a block diagram illustrating exemplary or representative message transmission sequences for personalization of search results and search result ranking in a search engine.

A user can connect to the search engine 225 within a server system 200 to submit a query and receive search results, as discussed in greater detail below with reference to FIG. 6. When the user submits the query through a user input device 345 attached to or forming part of a client device 300, 300A (such as a keyboard, a touch screen, a mouse, etc.), a client-side query signal is sent into a network 110 and is forwarded to the server system 200 as a server-side query signal. Server system 200 can be one or more server devices in one or more locations. A server device 200 includes a processor 210, which can include the search engine 225 loaded therein. A processor 210 is structured or otherwise programmed to process instructions within the server system (or apparatus) 200. These instructions can implement one or more components of the search engine 225. The processor 210 can be a single-threaded processor or a multi-threaded processor, and can include multiple processing cores 212. The processor 210 can process instructions stored in the memory 205 related to the search engine 225 and can send information to the client devices 300, 300A, through the network 110, to create a graphical presentation in a user interface of the client device 300, 300A (e.g., a search results web page displayed in a web browser, such as using HTML, XML, Javascript, etc., alone or in combination with each other), such as those illustrated and discussed below with reference to FIGS. 7-9.

For example, in system 100, a server system (or apparatus) 200 may be utilized to provide the personalization of search results and search result ranking in a search engine, interactively with a client device 300, 300A such as a computer or mobile smartphone, via network 110 (e.g., Internet). For such an embodiment, and as discussed in greater detail below with reference to FIGS. 7-9, a series of graphical user interfaces 700, 805, 810, 900, 930 are displayed on a client device 300, 300A, such as a computer or smartphone, with the user inputting information and making the various parameter selections described below via the series or succession of displayed graphical user interfaces 700, 805, 810, 900, 930 in the client device 300, 300A, which information and parameter selections are then transmitted to the server system (or apparatus) 200. In turn, the personalization of search results, customized filtering and personalization of search result ranking is performed by the server system (or apparatus) 200, using a search engine 225 (described below) and provides the personalization of search results and search result ranking (such as in the form of an HTML XML or scripting file) to the client device 300, 300A for display and selection via the one or more graphical user interfaces 700, 805, 810, 900, 930.

For example, representative embodiments of the subject matter described in this specification may be implemented in a computing system that includes a back-end or a middleware component, such as a server system or apparatus 200, or that includes a front-end component such as client devices 300, 300A having an interactive graphical user interface or a web browser (either or both of which may display the graphical user interfaces 700, 805, 810, 900, 930), or any combination of one or more such back-end, middleware, or front-end components. The components of the system can be interconnected by any form or medium of digital data communication, such as the illustrated network or internet 110 as a representative communication network (e.g., a local area network ("LAN") and a wide area network ("WAN"), an inter-network such as the Internet, and/or a peer-to-peer network. The server system or apparatus 200 and the client devices 300, 300A may utilize various different computing model infrastructures, such as web services, distributed computing and grid computing infrastructures, for example and without limitation.

Referring to FIG. 2, the exemplary or representative server system (or apparatus) 200 comprises one or more processor(s) 210, a network input/output ("I/O") interface 215, and a memory 205 (such as a random access memory (RAM) or the other forms of memory 205 described below, such as DRAM, SDRAM, etc., which also may include one or more databases 220A), and may be coupled to one or more additional data storage devices 250 for database 220 storage. Depending upon the selected embodiment, the server system or apparatus 200 may also include optional components discussed below with reference to client devices 300, 300A, such as user input devices, for example. The processor(s) 210, network input/output ("I/O") interface 215, memory 205, and data storage device 250 having a database 220, may be implemented or embodied as known or becomes known in the electronic arts, with various examples described in greater detail below. In addition, multiple server systems (or apparatuses) 200 may be utilized in a search system 100, for example and without limitation.

FIG. 3 is a block diagram illustrating an exemplary or representative client device (or apparatus) 300, 300A. Referring to FIG. 3, the exemplary client device 300, 300A comprises one or more processor(s) 305, a network input/output ("I/O") interface 315, and a memory 310 (such as a random access memory (RAM) or the other forms of memory 310 described below, such as DRAM, SDRAM, etc., which also may include one or more databases). Depending upon the selected embodiment, the client device 300, 300A may also include optional components such as a user input/output ("I/O") interface 320 (such as for coupling to a user input device 345 such as a keyboard, computer mouse, or other user input device, not separately illustrated), an audio input/output interface 325 (e.g., for coupling to a microphone 355, to audio speakers or other audio player 330, such as for auditory output of results), a display interface or controller 335, and may also include a display 340, such as an LED or LCD screen or mobile smartphone touch screen, such as for display of the various graphical user interfaces 700, 805, 810, 900, 930. The processor(s) 305, network input/output ("I/O") interface 315, memory 310, user input/output ("I/O") interface 320, audio input/output interface 325, audio player 330, display interface or controller 335, and display 340, may be implemented or embodied as known or becomes known in the electronic arts, with various examples described in greater detail below. In addition, multiple client devices 300, 300A may be utilized in a system 100, for example and without limitation. The processor 305 is structured or otherwise programmed to process instructions within the system 100. In various embodiments, the processor 305 is a single-threaded processor or may be a multi-threaded processor, and may have a single processing core or multiple processing cores (not separately illustrated). The processor 305 is structured or otherwise programmed generally to process instructions stored in the memory 310 (or other memory and/or a storage device included with the client device 300, 300A) to display graphical information for a user interface.

Referring again to FIG. 2, the search engine 225 of the processor(s) 210 of the server system (or apparatus) 200 receives (via network I/O interface 215) the server-side query signal transmitted from a client device 300, 300A via the network 110. The search engine 225 utilizes the information within the user query (as described in greater detail below) to generate and provide personalized search results, customized filtering, and personalized search result ranking. The search engine 225 may comprise one or more of the following subsystems or components, such as a return query generator 230, a scoring generator 235, a ranking generator 240, and optionally a rank modification generator 245, which are adapted, configured or programmed to perform the personalized search, scoring, customized filtering, and personalized ranking methodologies described in greater detail below. The search engine 225, and any or all of its subsystems or components, may also be distributed between and among the processing cores 212 in a representative embodiment.

As described in greater detail below, a user (referred to as a first, second, third or next (etc.) respondent), using a client device 300, 300A and typically following a log in or user registration process, generates one or more client-side queries 605 transmitted via the network 110 and received by the server system 200 as one or more server-side queries 610, or referred to herein more simply as a query or queries 605, 610. In a representative embodiment, the one or more client-side queries 605 are selected from a drop down menu 710 provided in a graphical user interface 700 (illustrated in FIG. 7), for example and without limitation. In another representative embodiment, the user may input the query or queries 605, 610, and the search engine 225 (and more particularly the return query generator 230) will utilize the query 605, 610 (e.g., through keywords such as "electrical", "automotive", "engineer", and so on, also for example and without limitation), as discussed in greater detail below. These one or more client-side queries 605 are then transmitted (via network 110) to the search engine 225 (e.g., by the user clicking on the NEXT button 720 in the GUI 700, for example). For online employment compatibility search, matching and ranking, such a client-side query 605 may be a job title or occupation or employment position, for example and without limitation. For other types of online searching, matching and ranking, the client-side query 605 may take other forms, such as a selection of geographic regions for searching for real estate such as a house, apartment, condominium, cooperative, etc., or searching for a spouse or companion, or searching for other types of personalized information (e.g., automobile, professional, book, music or clothing recommendations), all for example and without limitation.

Also as described in greater detail below, instead of returning search results in response to the query 605, 610, the return query generator 230 of the search engine 225 of the server system 200 retrieves (from memory 205 and/or from database 220 stored in data storage device 250) and transmits a plurality of "return queries" (or "reverse queries") 615 (for the server-side return queries 615, transmitted via network 110 to form client-side return queries 620, and referred to herein more simply as return queries 615, 620) to this respondent (or co-respondent). These return queries 615, 620 have at least one of several forms, and all are one or more series of questions pertaining to parameters or characteristics directly relevant to the client-side query 605, such as questions directly relevant to activities which may or may not be performed for the selected job title or occupation or employment position being sought, for example and without limitation. As such, the return queries 615, 620 may also be considered, equivalently, to be "parameter requests", for the search engine 225 to obtain various parameters (determined by the user) which are used to provide customized filtering, as discussed in greater detail below. In a representative embodiment, the return queries 615, 620 are stored and indexed in the memory 205 and/or database 220 stored in data storage device 250, such as indexed by job title, position, or keywords (e.g., through keywords such as "electrical", "automotive", "engineer", and so on, also for example and without limitation), and as a result, the return query generator 230 may utilize the query 605, 610 or keywords of the query 605, 610 to access the memory 205 and/or database 220 stored in data storage device 250 and retrieve the return queries 615, 620 corresponding to the indexed query 605, 610 and/or its keywords. Such an index system in the memory 205 and/or database 220 may have any number of forms and structures, as known or becomes known in the art, such as a series of database tables, look-up tables, etc.

As a corollary, the server system 200 is also receiving client-side queries 605 (as server-side queries 610) from client devices 300, 300A from other sources, such as from companies who are offering employment opportunities and looking to add employees or contractors, from real estate sellers and agents, from vendors, etc., for example and without limitation. To distinguish these users, they are referred to herein as first, second, third or next (etc.) co-respondents, for the pair-wise scoring described in greater detail below; those having skill in the art will recognize that depending upon the circumstances or situation, any given user may be a respondent or co-respondent, or all may simply be respondents or co-respondents (e.g., in a social matching application, all may be respondents, or may be categorized as respondents and co-respondents based on gender and preferences, also for example and without limitation). Again, instead of returning search results in response to the query 605, 610, the return query generator 230 of the search engine 225 of the server system 200 generates and transmits a plurality of return queries 615, 620 to this (first or next) co-respondent. These return queries 615, 620 are also one or more series of questions pertaining to (corollary) parameters or characteristics directly relevant to the client-side query 605, such as questions directly relevant to activities which may or may not be performed for the selected job title or occupation or employment position being offered, or to social or sports activities (e.g., theatre, football, skiing) which may or may not be performed for social engagements, for example and without limitation.

In a representative embodiment, the return queries 615, 620 to the respondent and to the co-respondent pertain to identical or similar information, but from different, corresponding (or corollary) perspectives. For example, from a first perspective (e.g., a respondent perspective), a return query 615, 620 may ask (and present a sliding scale on a graphical user interface for a response) how much the user enjoys or wants to do a typical employment activity, e.g., for a mechanical engineer, how much the user likes (or dislikes) stress and strain analysis. Also for example, from a second, corollary perspective (e.g., a co-respondent perspective), a return query 615, 620 may ask (and present a sliding scale on a graphical user interface for a response) how much time the user expects the employment candidate to be engaged in a typical employment activity, e.g., for a mechanical engineer, how much time the employee will be expected to perform stress and strain analysis. As such, the return queries 615, 620 to the respondents and co-respondents, for any given client-side query 605, pertain to identical or similar types of information, so that the answers or responses to the return queries 615, 620 of the respondents and co-respondents may be directly compared and scored, as discussed in greater detail below, to provide customized filtering and personalization of search results and search result ranking.

Similarly, suitable return queries 615, 620 are available for other types of online searching, filtering, matching and ranking, such as searching for real estate, searching for a spouse or companion, or searching for other types of personalized information (e.g., automobile, book, music or clothing recommendations). For example and without limitation, such return queries 615, 620 may pertain to expected commute times, access to public transportation, job availability, entertainment availability, and expected quality of the public schools in a geographic region, for real estate searching. Those having skill in the art will recognize that innumerable return queries 615, 620 may be developed and deployed for any selected search topic for customized filtering and personalization of search results and search result ranking, and all such return queries 615, 620 are within the scope of this disclosure. For example and without limitation, a representative embodiment of a search engine 225, representative client-side queries 605, and representative corresponding return queries 615, 620 for employment contexts are available at http://www.workfountain.com. Similarly, various other public sources provide significant databases (available to the public) having listings of hundreds to thousands of job titles and, for each such job title, relevant activities to be performed and skills required for that selected job title (e.g., a listing of 50-100 relevant activities to be performed and skills required for that selected job title, for thousands of different job titles), such as available through O*NET under the sponsorship of the U.S. Department of Labor/Employment and Training Administration (USDOL/ETA), at https://www.onetonline.org. For other applications of the personalization of search results and search result ranking disclosed herein, suitable return queries 615, 620 may be obtained or derived from a wide variety of public and private or subscription sources, such as multiple listing services for real estate, also for example and without limitation.

Those having skill in the art will recognize that any and all such return queries 615, 620 are likely to vary over time and be indexed in the memory 205 and/or database 220 for entirely new keywords, positions or job titles, as entirely new fields and employment opportunities are developed and implemented, and correspondingly return queries 615, 620 may be developed and deployed for any selected search topic for personalization of search results, customized filtering, and personalization of search result ranking. Innumerable examples of recently developed new fields are available, and might include smartphone application development, online music download development, social media web development, and ebook websites, and so on.

As mentioned above, in another representative embodiment, instead of selecting one or more queries 605, 610 (such as from a drop down menu 710) the user may input their own, personal query or queries 605, 610, and the search engine 225 (and more particularly the return query generator 230) will utilize the query 605, 610 (e.g., through keywords such as "electrical", "automotive", "engineer", and so on, also for example and without limitation), as mentioned above, to access the memory 205 and/or database 220 and retrieve the return queries 615, 620 corresponding to the indexed query 605, 610 and/or its keywords.

In addition, as one aspect of the artificial intelligence of the representative embodiments, the search engine 225 may also suggest additional queries 605, 610 to the user, such as queries 605, 610 for related fields and occupations, e.g., suggesting automotive engineering to a mechanical or aerospace engineer, or suggesting the occupation of county commissioner to a lawyer, for example and without limitation. In addition, in many such fields, there may be a substantial overlap of return queries applicable to these various, different but related fields, such as to the different engineering fields, for example. In another representative embodiment, such related fields may be cross-indexed or otherwise flagged, such that the return query generator 230 may automatically generate and push additional return queries 615, 620 to the respondent or co-respondent that would or might be included in response to queries 605, 610 for these related fields, but which may not be otherwise included in return queries 615, 620 pertaining to any selected, initial query 605, 610, such as automatically generating additional return queries 615, 620 pertinent to automotive engineering in response to a different query related to mechanical or aerospace engineering, also for example.

As discussed in greater detail below, the responses to the return queries 615, 620 (equivalently referred to as parameter requests 615, 620), received by the server system 200 from the various respondents and co-respondents, may be considered to be customizable parameters, and may be utilized by one or more processors 210 to form corresponding respondent customized digital filters (350, $350_A$, 370, $370_A$) and co-respondent customized digital filters (360, $360_A$) which, in turn, may be utilized for personalization of search results and personalization of search result ranking. The resulting digital filters (350, $350_A$, 360, $360_A$, 370, $370_A$) are then stored by the one or more processors 210 of the server system 200 centrally in a data storage device 250 and/or a memory 205, for example and without limitation. Such customized filters are discussed in greater detail below with reference to FIGS. 11 and 12.

Also discussed in greater detail below, based upon responses (parameters) to the return queries 615, 620 received by the server system 200 from the various respondents and co-respondents, as the case may be, the server system 200 performs a pair-wise scoring (pair-wise "goodness of fit" or "alignment" scoring), typically across all (or most) of the relevant combinations of respondent-co-respondent pairs (or more simply, respondent pairs), and using the pair-wise scoring, returns personalized and ranked search results. Such pair-wise scoring across all (or most) of the relevant combinations of respondent-co-respondent pairs may also be performed equivalently using the respondent customized digital filters (350, 350$_A$, 370, 370$_A$) and co-respondent customized digital filters (360, 360$_A$), also to return personalized and ranked search results, as discussed in greater detail below.

For an employment context, from an employer point of view, instead of receiving hundreds or thousands of resumes, these personalized and ranked search results translate to receiving ranked results of individual candidates seeking a given employment opportunity and having the highest pair-wise scorings for that employer, indicating that they are the candidates most likely to fit and succeed in the employment opportunity, resulting in a huge savings of time in reviewing candidates/resumes, a reduction in turnover costs, and a dramatic reduction in the amount of time required to fill a selected position or employment opportunity with a qualified candidate whose interests and goals align with those of the employer. Similarly, from an employment candidate point of view, these personalized and ranked search results translate to receiving ranked results of companies offering a given employment opportunity and having the highest pair-wise scorings for that individual candidate, indicating that they are offering a job opportunity in which the candidate is most likely to fit and succeed, in a position providing activities meeting the individual candidate's interests and career goals.

Figure 4B:
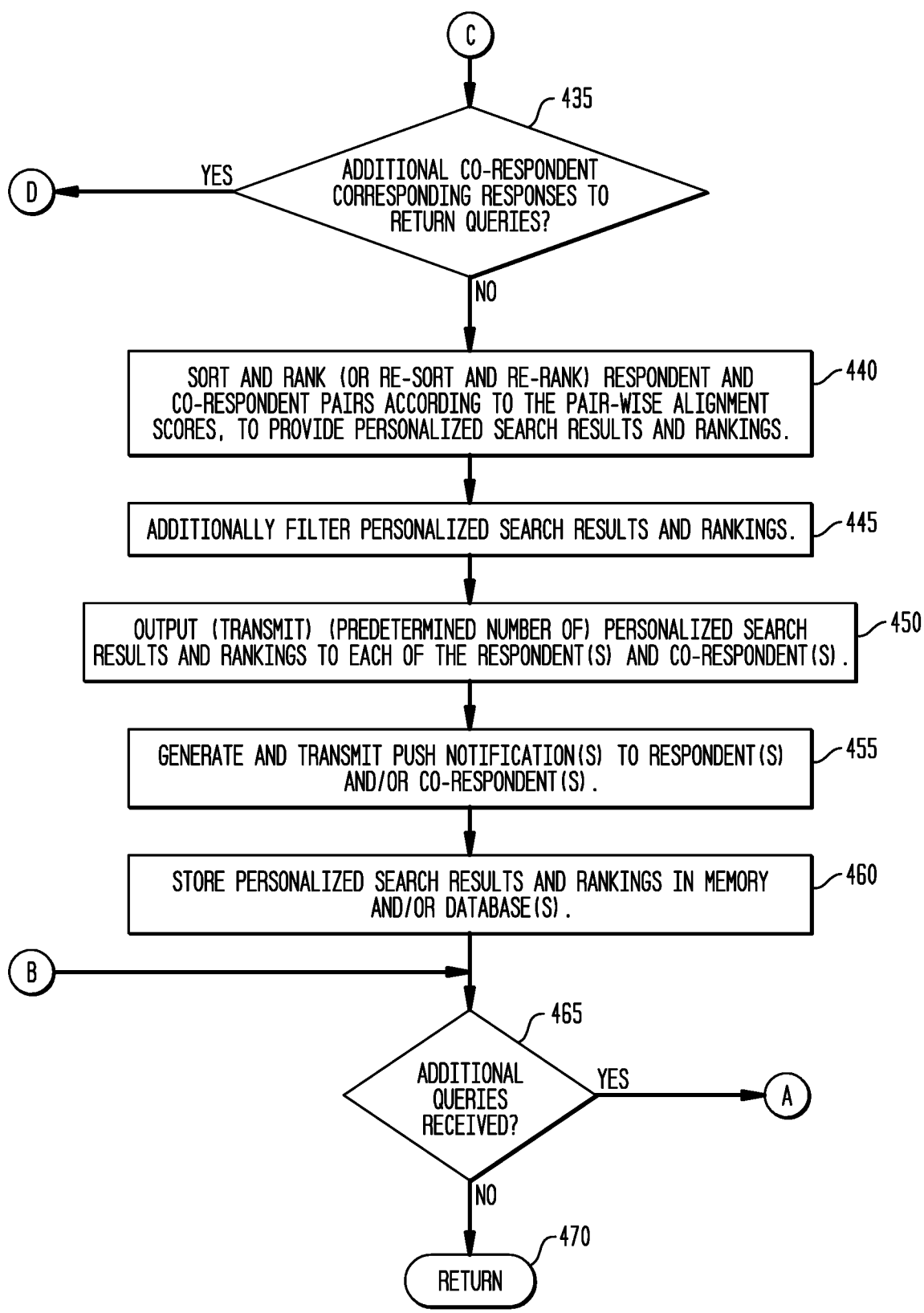
Figure 5B:
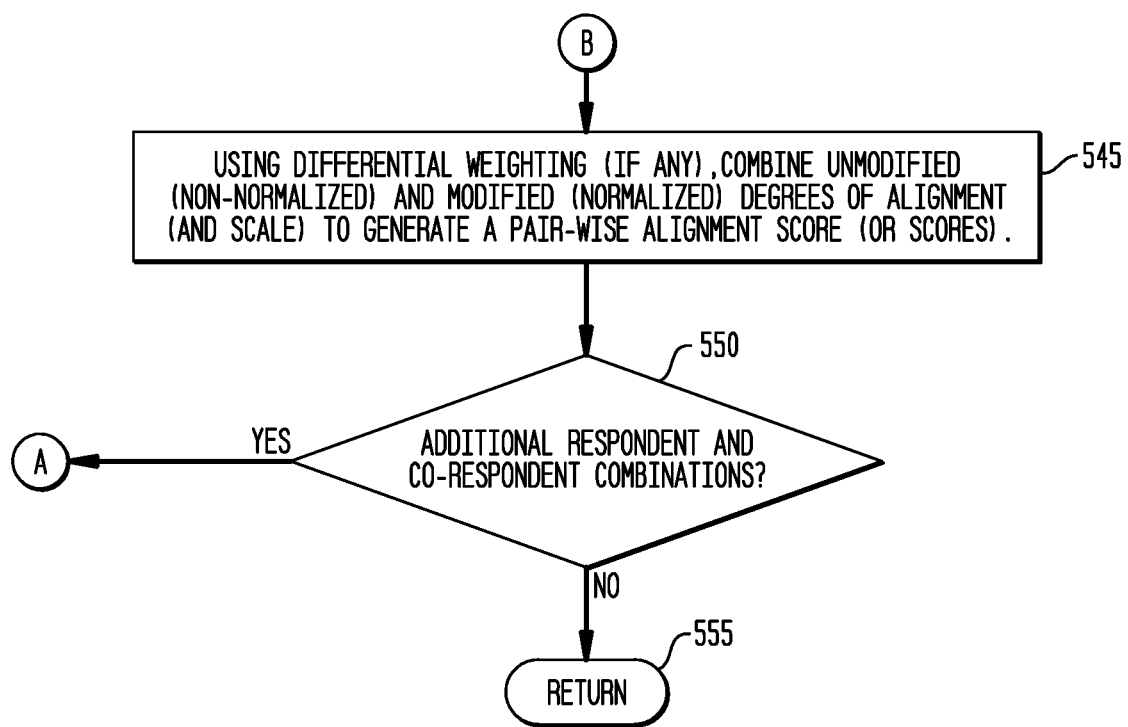
Figure 7:
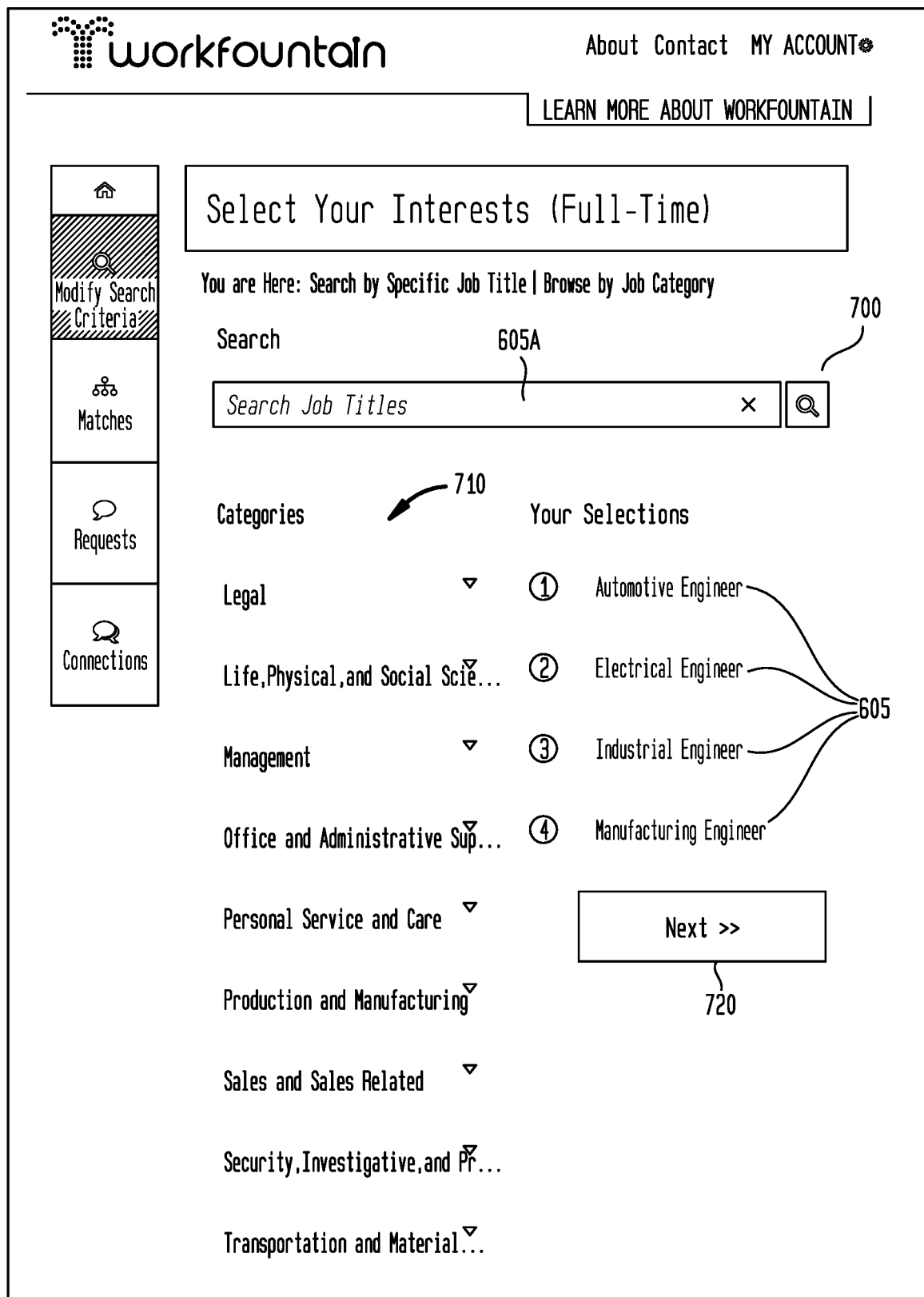
FIG. 7 is a diagram illustrating an exemplary or representative graphical user interface ("GUI") providing user-selectable initial client-side queries.
Figure 8A:
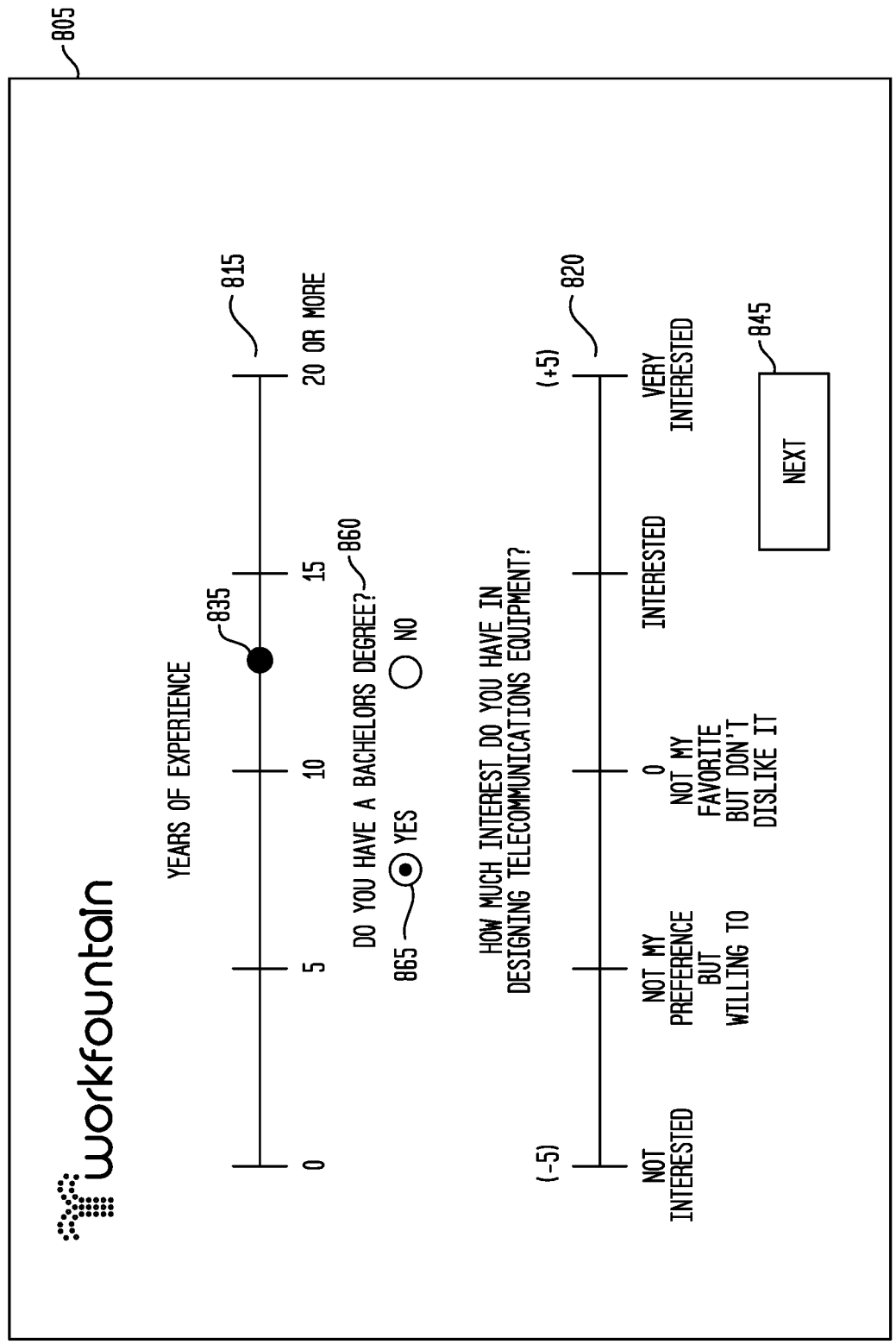

FIG. 4 is a flow diagram illustrating an exemplary or representative method embodiment for personalization of search results and search result ranking in a search engine. FIG. 5 is a flow diagram illustrating an exemplary or representative method embodiment for pair-wise (or dyadic) score determination for personalization of search results and search result ranking in a search engine. FIG. 6 is a block and flow diagram illustrating exemplary or representative message transmission sequences for personalization of search results and search result ranking in a search engine. FIG. 7 is a diagram illustrating an exemplary or representative graphical user interface providing user-selectable initial client-side queries 605. FIGS. 8A and 8B are paired respondent and co-respondent diagrams illustrating exemplary or representative graphical user interfaces illustrating representative return queries 615, 620 providing user-selectable parameters for pair-wise score determination for personalization of search results and search result ranking in a search engine. FIGS. 9A and 9B are sequences of diagrams illustrating exemplary or representative graphical user interfaces, respectively, for output of personalized search results and search result ranking, and for follow on communications.

In a representative embodiment, a user (respondent or co-respondent) typically registers with the search provider, such as Workfountain (www.workfountain.com) and establishes a free account, for several reasons, including to enable push notifications (and select the type(s) of notifications, such as text, email, etc.) when personalized and ranked search results are returned, and to enable the user to access the search results and communicate with a candidate or prospective employer, for example and without limitation.

Additional information may also be collected at that time or any other time (e.g., at the end) in the process of responding to the return queries 615, 620, depending on the selected embodiment. For example, for applications of the personalization of search results and search result ranking in employment contexts, additional information may be collected, also via a series of graphical user interfaces (not separately illustrated), such as colleges and universities attended, degrees received, citizenship, current and past employers, and other talents, such as fluency in one or more languages, skill or fluency in various software programs, and demographics (which are useful for compliance determinations and reporting), along with opportunities to upload various documents, such as resumes, for example and without limitation. Any number of these attributes may be utilized for additional filtering as well to create the personalized search results and search result rankings, such as additional, user-selectable filtering to block a current or past employer or employee from pair-wise scoring and thereby block the possible matching to one another in the results returned, or to additionally filter based on geographic regions, language skills, citizenship, visa status, college degree level, for example and without limitation. With entry of this information, along with responding to the return queries 615, 620 (equivalently, providing parameters) described below, the user will have completed a user profile which, depending upon the outcome of the personalization of search results and search result ranking process, may be provided to a prospective employer or a prospective candidate, for example, as part of the search results and search result ranking returned to the user.

Referring to FIG. 4 and the other Figures, an exemplary or representative method embodiment for personalization of search results and search result ranking in a search engine 225 begins, start step 400, with a reception of one or more queries 605, 610 by the search engine 225, or the presentation by the server system 200 of a plurality of selectable queries 605, 610 to the user, such as via the graphical user interface illustrated in FIG. 7, and then reception of one or more queries 605, 610 by the search engine 225. For example, as illustrated in FIG. 7, one or more queries 605 are illustrated, both via drop down menus and via entry by the user into a blank search space (for a query 605$_A$, "Search Job Titles") of graphical user interface 700.

The return query generator 230 then utilizes the received one or more queries 605, 610, either using keywords from the one or more queries 605, 610 or by the one or more queries 605, 610 already having been directly indexed into the memory 205 and/or database 220, to retrieve a plurality of return queries 615, 620 stored in the memory 205 and/or database 220, step 405, and transmit (or return) the first (or next) series of the return queries 615, 620 to the user via network 110. As mentioned above, in a representative embodiment, the return queries 615, 620 are typically user preference questions concerning characteristics, traits, or features which are directly relevant to the search, such as those illustrated in FIGS. 8A and 8B. As the user (respondent or co-respondent) provides responses to the return queries 615, 620 (using NEXT button(s) 845, 850 of GUIs 805, 810) which are received by the search engine 225, step 415, depending upon the particular search and number of relevant return queries 615, 620, when additional return queries 615, 620 are available, step 420, the method iterates, returning to step 410 and transmitting the additional return queries 615, 620 and receiving the additional responses, steps 410 and 415. (In the event responses are not received in step 415, depending on the selected embodiment, the search engine 225 may proceed to step 420 if responses have been received previously, or proceed to step 465 to determine if additional queries 605, 610 have been received, for example). As indicated above, in a representative embodiment, as many as fifty or more return queries 615, 620 may be available for a given search, such as for a selected job title or employment opportunity. In addition, multiple queries 605, 610 may have been received in step 400, typically resulting in a larger number of return queries 615, 620 provided to the user (respondent or co-respondent) by the return query generator 230 of the search engine 225.

The return queries 615, 620 are typically provided to a user via a graphical user interface, such as the graphical user interfaces 805 and 810 illustrated in FIGS. 8A and 8B, with each return query 615, 620 typically generated and provided using a graphical scale or continuum in representative embodiments, which in turn provides that the corresponding responses are directly quantifiable, such as by numerical values, and can be directly compared and normalized or otherwise modified (e.g., comparing the numerical values provided by a respondent and co-respondent when that user clicks on the scale or continuum). There are typically at least two or more types of scale or continuum return queries 615, 620, those which are balanced, such as the scaled questions 820, 830 illustrated in FIGS. 8A and 8B, ranging from a −5 to a +5 and centered at zero (0), and unbalanced, such as the scaled questions 815, 825 illustrated in FIGS. 8A and 8B, ranging from zero (0) to a +20 or more. In addition, various return queries 615, 620 may also be provided for yes or no responses, as dichotomous variables, such as yes/no question 860 (e.g., for responses presented as radio buttons 865 in a GUI 805, 810), such as "do you have a bachelors degree?" as illustrated, or others such as "did you go to college?" or "is a college degree necessary for this position?", etc. Those having skill in the art will recognize that any balanced scale can be converted to an unbalanced scale, and vice-versa, without affecting any of the pair-wise scoring calculations and search determinations herein. Those having skill in the art will also recognize that many other question and query types and formats are available which can be converted into quantifiable or numerical values for use in scoring and/or filtering, any and all of which are considered equivalent and within scope of the disclosure. As illustrated in FIG. 8A, as known in the art, a user will click (typically through a pointing device such as a mouse, trackpad, touchscreen or other user input device 345) on the scale of the return query 615, 620, which typically results in buttons (such as a radio buttons) 835 appearing in the selected locations as shown. As illustrated in FIG. 8B, as known in the art, a user will move slider buttons or devices 840 (also typically through a pointing device such as a mouse, trackpad, touchscreen or other user input device 345) on the scale of the return query 615, 620, to the selected location as shown. Regardless of implementation, both graphical user interface 805, 810 implementations provide the capability for a user to respond to the return queries 615, 620 and have a quantifiable or numerical result, as a customized parameter, returned to the search engine 225 in step 415 (also illustrated as client- and server-side messages 625, 630 in FIG. 6).

FIGS. 8A and 8B also illustrate the different, corresponding (or corollary) perspectives of the return queries 615, 620 for a respondent and a co-respondent pertaining to different goals or interests which may be relevant, for example, in an employment context. For example, as illustrated in FIG. 8A, balanced, scaled question 820 asks a respondent (from a first perspective) to indicate how much interest the respondent has in designing telecommunication equipment, and providing for answers ranging from "not interested" (numerical value of −5), "not my preference but willing to" (numerical value of −2.5), "not my favorite but don't dislike it" (numerical value of 0, i.e., a "don't care"), "interested" (numerical value of +2.5), and "very interested" (numerical value of +5), and yes/no question 860 asks a respondent if he or she has a bachelors degree. Continuing with the example, as illustrated in FIG. 8B, balanced, scaled question 830 asks a co-respondent (from a second perspective, such as an employer perspective) to indicate how much time the co-respondent (e.g., the employer) would expect a candidate to spend designing telecommunication equipment, and providing for answers ranging from "not at all" (numerical value of −5), "not often, if ever" (numerical value of −2.5), "occasionally" (numerical value of 0), "often" (numerical value of +2.5), and "most of the time" (numerical value of +5), and yes/no question 870 asks the co-respondent if a bachelors degree is required for the position. Those having skill in the art will recognize that a respondent who is very interested in designing telecommunication equipment, all other things being equal (such as the degree of alignment on other relevant responses), may be a very good candidate for a company seeking an engineer who will spend most of his or her time designing telecommunication equipment. Accordingly, the return queries 615, 620 are directly corresponding, as corollaries or parallel, related questions, resulting in the responses to the return queries 615, 620 for a respondent and a co-respondent being directly comparable and commensurate, which can be utilized (as quantized, numerical values or customized parameters) by the scoring generator 235 directly in the pair-wise scoring and/or customized digital filtering processes discussed in greater detail below.

Those having skill in the art will recognize that return queries 615, 620 for a respondent and a co-respondent may be developed similarly, not merely for other types of employment opportunities, but also for other fields, topics, and areas of interest for personalization of search results and search result ranking in a search engine 225, such as for real estate searching, for example and without limitation. For example, a representative balanced, scaled question may ask a respondent (from a first perspective) to indicate how much interest the respondent has in purchasing a home in a highly ranked school district, and also providing for answers ranging from "not interested" (numerical value of −5), "not my preference but willing to" (numerical value of −2.5), "not my favorite but don't dislike it" (numerical value of 0, i.e., a "don't care"), "interested" (numerical value of +2.5), and "very interested" (numerical value of +5). Continuing with the example, a representative balanced, scaled question may ask a co-respondent (from a second perspective, such as a real estate agent or seller perspective) to indicate the ranking of the local school(s), and providing for answers ranging from "not respected at all" (numerical value of −5), "other schools available" (numerical value of −2.5), "acceptable" (numerical value of 0), "respected" (numerical value of +2.5), and "highly respected" (numerical value of +5). Those having skill in the art will recognize that a respondent who is very interested in sending his/her children to a local magnet school, all other things being equal, may be a very good candidate for a seller having a home in such a neighborhood. Accordingly, the responses to the return queries 615, 620 for a respondent and a co-respondent are directly comparable and commensurate across a wide range of potential searches, and can be utilized (as quantized, numerical values) by the scoring generator 235 directly in the pair-wise scoring and/or customized digital filtering processes discussed in greater detail below.

Those having skill in the art will also recognize that as the server system 200 is utilized repeatedly for personalization of search results and search result ranking, the memory 205 and/or database 220 will become populated with responses to the return queries 615, 620 for a plurality of respondents and co-respondents. In addition, the responses to the return queries 615, 620 may be represented numerically (or mathematically) in a wide variety of ways, such as by a plurality of numerical values forming a customized digital filter (e.g., as a matrix 350, 360, or a vector $350_A$, $360_A$, $370_A$), or otherwise by numerical values for a selected employment opportunity or other search topic of interest (e.g., [−5, 0, +2.5, +5, . . . ]). Similarly, there may be occasions when a respondent or co-respondent does not respond to a particular return query 615, 620 and, in that event, that particular return query either can be removed from the scoring process (unscored) or a "don't care" (e.g., a zero value of a balanced scale) can be inserted, for example and without limitation, and any and all such variations are considered equivalent and within the scope of the disclosure.

Referring again to FIG. 4, following steps 410-420, with the responses to the return queries 615, 620 (from a respondent or co-respondent) having been received, in step 425, the search engine 225 proceeds to search the memory 205 and/or database 220 for one or more sets of indexed, corresponding (preference or parameter) responses, i.e., searching the responses to the return queries 615, 620 from one or more co-respondents or respondents, respectively, such as searching the memory 205 and/or database 220 for candidate responses to the return queries 615, 620 for a selected employment opportunity (as a respondent) to be used in scoring against the responses to the return queries 615, 620 submitted by an employer offering the selected employment opportunity (as a co-respondent).

In representative embodiments, the scoring generator 235 then compares the responses to the return queries 615, 620, from a selected combination of a selected respondent and a selected co-respondent, step 430, such as the scoring generator 235 then determining a comparative, pair-wise (or dyadic) score (a pair-wise "goodness of fit" or "alignment" score) for a selected respondent-co-respondent combination or pair, using any of the various methods disclosed herein and their equivalents. As there may be many such respondent-co-respondent combinations relevant or related to any particular user query 605, 610, when there are any such additional combinations remaining for scoring in step 435, the scoring generator 235 iterates, returning to step 430 to generate or determine the next pair-wise score for the next respondent-co-respondent combination, typically iterating across all (or most) of the relevant combinations of respondent-co-respondent pairs (or more simply, respondent pairs, depending on the selected embodiment), generating a plurality of pair-wise scores, one such score for every relevant respondent-co-respondent pair (that has not been eliminated as a possible combination due to additional filtering, for example, of a current employer or employee). For example, an employer "A" may be seeking candidates for a position "Q", an employer "B" may be seeking candidates for a similar position "Q", and 25 potential candidates (1, 2, 3, . . . , 25) are seeking such a "Q" employment opportunity. Also for example, an employer "C" may be seeking candidates for a position "R", and 15 other potential candidates (26, 27, 28, . . . , 40) are seeking such an "R" employment opportunity. Accordingly, the scoring generator 235 will generate, in these two examples, a total of 65 pair-wise scores, for every relevant respondent-co-respondent pair, resulting in: (1) for the "A" combinations, a score for the combination A-1, another score for the combination A-2, another score for the combination A-3, etc., through another score for the combination A-25; (2) for the "B" combinations, a score for the combination B-1, another score for the combination B-2, another score for the combination B-3, etc., through another score for the combination B-25; and (3) for the "C" combinations, a score for the combination C-26, another score for the combination C-27, another score for the combination C-28, etc., through another score for the combination C-40. To the extent that the "Q" and "R" employment opportunities may overlap, and have overlapping return queries 615, 620 and responses to the return queries 615, 620, additional pair-wise scores may be generated as well, such as for all remaining pair-wise scores covering all dyadic combinations of the "Q" and "R" employment opportunities with the potential candidates (1, 2, 3, . . . , 40). A wide variety of pair-wise scoring methods are available, with a representative scoring embodiment discussed in greater detail below with reference to FIG. 5, and another embodiment using customized digital filters, discussed in greater detail below with reference to FIG. 12.

Following generation or determination of the pair-wise alignment scores for each combination of respondent and co-respondent (in steps 430 and 435), the ranking generator 240 sorts and ranks (or re-sorts and re-ranks) each of these respondent-co-respondent combinations according to the corresponding pair-wise alignment score for the selected combination, step 440, typically ranked from highest to lowest, and does so for each of the respondents and co-respondents. Continuing with the example above, a representative sorting and ranking will be generated for a selected co-respondent (e.g., an employer) "A", as respondent 3 (score for the A-3 combination equal to 90%), followed by respondent 6 (score for the A-6 combination equal to 85%), etc., while another (and typically different) sorting and ranking will be generated for each of the respondents (e.g., candidates). Continuing again with the example above, a representative sorting and ranking will be generated for respondent 3, as co-respondent B (score for the B-3 combination equal to 95%) followed by respondent A (score for the A-3 combination equal to 90%), etc., while a representative sorting and ranking will be generated for respondent 8, as co-respondent A (score for the A-8 combination equal to 75%) followed by respondent B (score for the B-8 combination equal to 70%), etc. This also shows that the various sorting and ranking can result in each respondent and co-respondent having different search results and rankings; for example, respondent 3 is highest ranked in employer A's ranking, but the converse is not true, with employer B being ranked higher in respondent 3's ranking. In addition, for the latter example for respondent 8, having comparatively lower alignment scores, it is possible that depending upon the number of personalized results and rankings provided to the relevant co-respondents, respondent 8 might not be included in one or more (or any) of the co-respondents search results and rankings (having alignment scores, for example, below a predetermined threshold or cut-off).

Using this pair-wise (or dyadic) alignment scoring for every such relevant combination, it can be seen that following sorting and ranking by the alignment scores, the search engine 225 has generated personalized search results and search result rankings, as a mutual goodness of fit between each combination of respondents and co-respondents.

Following the sorting and ranking of step 440, the personalized search results and search result rankings (or a predetermined number or amount of personalized search results and search result rankings) are additionally filtered by the search engine 225, step 445, when indicated in the user profile information of a respondent or a co-respondent as mentioned above, such as to block or eliminate potential search results, e.g., to block or eliminate a ranked search result (combination) of a current employee and current employer, for example and without limitation. The (filtered) personalized search results and search result rankings are output by the search engine 225 to each of the respondents and co-respondents, step 450, such as through the representative, personalized, sorted and ranked listing 910 of candidates shown on GUI 900 illustrated in FIG. 9A. In representative embodiments, the search engine 225 may also and preferably does provide one or more push notifications (e.g., a text or an email, for example, to a computer or a smartphone of a respondent or a co-respondent) of the personalized search results and search result ranking, step 455 (also illustrated as server- and client side messages 635, 640 and server- and client side push notification messages 645, 650 in FIG. 6).

The significance of this latter notification step should not be underestimated, as these personalized search results and search result rankings may be quite time-sensitive, especially for searches in selected areas, such as employment and real estate, for example (e.g., employment opportunities may get "stale" quickly as positions get filled or candidates accept other employment opportunities, especially in competitive environments), and a respondent or a co-respondent may want to be notified immediately of pertinent or relevant search results. For example, a candidate may want an immediate notification to promptly respond to a good employment opportunity, while an employer may want an immediate notification to promptly respond to and recruit a good candidate, e.g., to be able to respond appropriately and timely before someone else might respond to the opportunity or recruit the candidate. Also for example, in other contexts such as real estate searching, a respondent or a co-respondent may want to be notified immediately of pertinent or relevant search results, to place an offer for a property of a new real estate listing, such as in a "hot" real estate market.

The personalized search results and search result rankings are also stored by the search engine 225 in the memory 205 and/or database 220, step 460. When additional queries 605, 610 are received, step 465, the search engine 225 will iterate, returning to step 405, and otherwise the method may end, return step 470.

Those having skill in the art will recognize that the steps indicated in FIG. 4 (and in FIG. 5) may be performed in a wide variety of orders, for example, additional filtering step 445 may be performed at any time prior to outputting the personalized search results and search result rankings. In addition, many of the steps and processes may be performed by the search engine 225 in parallel or multithreaded, particularly in multicore embodiments, such as the scoring of each respondent and co-respondent combination assigned to a different core 212 in a multicore processor 210, or performed simultaneously and in parallel across different queries 605, 610 and corresponding return queries 615, 620 or for different respondents and co-respondents, with all such variations considered equivalent and within the scope of the present disclosure.

As new queries 605, 610 are received by the search engine 225, it should also be noted that the personalized search results and search result rankings are likely to change. For example, new candidates for employment opportunities and new employers offering employment opportunities all may be participating in this process, and as each respondent or co-respondent provides new queries 605, 610 to the search engine 225 and responds to the return queries 615, 620, new personalized search results and search result rankings may be generated, depending of course upon the actual pair-wise scores generated by each new available combination of respondents and co-respondents. In a representative embodiment, however, this "churning" of personalized search results and search result rankings does not have to be calculated or re-calculated for all respondents in the memory 205 or database 220 every time there may be a change; for example and without limitation, the redetermination of personalized search results and search result rankings may be deferred until a user (respondent or co-respondent) logs into the server system 200, or the redeterminations of the personalized search results and search result rankings may simply be performed at regular intervals, e.g., 3 a.m. when it is less likely that respondents and co-respondents will be accessing the server system 200, or periodically throughout the day. With each such generation of new personalized search results and search result rankings, additional push notifications are also typically generated (step 455) to the various respondents and co-respondents.

In addition, as new candidates for employment opportunities and new employers offering employment opportunities all may be participating in this process, various other candidates or employers may have left or withdrawn from the search process, effectively becoming inactive. Nonetheless, in representative embodiments, the responses to the return queries 615, 620, as user-determined characteristics or user-customizable parameters, may persist over time within the system 200, for any predetermined amount of time, and can continue to be utilized in the search process, continuing to generate new personalized search results and search result rankings, with additional push notifications also being generated (step 455) to various respondents and co-respondents that may no longer be active. This may be especially valuable when available employment opportunities have not been filled, but potential candidates may have withdrawn from the search process and may be unaware of such an opportunity that they would otherwise be seeking.

Also in addition, the selection of respondent and co-respondent combinations may be selectively varied, such that not all respondents and co-respondents are utilized in generating personalized search results and search result rankings. In a representative embodiment, some "pools" of respondents and co-respondents available for use in providing personalized search results and search result rankings may be limited, or initially limited and then expanded after a predetermined interval of time. For example, some employers, as co-respondents, may request exclusive access to a selected pool of potential employment candidates, as respondents, for a predetermined period of time, for generation of personalized search results and search result rankings.

In addition, the personalized search results and search result rankings may also be modified by a respondent or co-respondent, in any selected time frame (e.g., immediately, a thirty-day delay, etc.), and this modification may also be prompted by the various representative embodiments, as discussed below. For example, an employer or seller of real estate may not have received any personalized search results and search result rankings above a predetermined alignment score threshold. In that event, the respondent or co-respondent may repeat the process of responding to the return queries 615, 620, to adjust the various preference parameters (resulting in modifying (or decreasing the amount of) any constraints, such as the amount of time to be expected on various projects), with the search engine 225 (and/or rank modification generator 245) then repeating the scoring, sorting and ranking processes, and generating a new set of personalized and ranked search results. This also underscores the importance of the push notifications with the time-sensitivity of the information returned in the personalized and ranked search results, as it is entirely possible that a respondent or co-respondent has taken or eliminated an employment opportunity quickly, or entered into a contract to purchase real estate in a "hot" market, all for example, thereby removing the respondent or co-respondent from the available search pool of respondents and co-respondents, resulting in fewer results to be personalized and ranked for another co-respondent or respondent.

In addition, as another aspect of the artificial intelligence of the representative embodiments, the search engine 225 may also suggest these various changes in the responses to the return queries 615, 620, to adjust the various preference parameters, with the search engine 225 (and/or rank modification generator 245) then repeating the scoring, sorting and ranking processes, and generating a new set of personalized and ranked search results. For example, the search engine 225 may run one or more simulations with these modified responses to the return queries 615, 620 (modified preference parameters, or modified variables), and generate a report back to the user with the new sets of personalized and ranked search results. Continuing with the example, such a report may indicate that the user would have an increased number of employment opportunities if the user (as a potential employment candidate) acquired a new technical skill, such as acquiring a new skill in using a selected programming language.

Also continuing with the example, the artificial intelligence included within the search engine 225 may provide additional feedback to various users, such as suggesting training programs to an employer. For example, such a report may indicate that the user (as a potential employer) would have an increased number of internal candidates for known employment opportunities and career promotions if the user invested in and provided training to the internal candidates, such as to enable the internal candidates to acquire a new technical skill, as mentioned above. Further continuing with the example, the artificial intelligence included within the search engine 225 may also provide these various simulations using historical trend data for a user, such as an employer. The search engine 225 may also run these various simulations using historical trend data for employment opportunities, such as seasonal data, indicating that in a selected time period, the user will have additional internal employment opportunities, and may wish to redeploy current employees to those positions, instead of terminating their current employment and needing to hire new employees in a few months, for example. This artificial intelligence of the search engine 225, therefore, has the added benefits of a reduction in employee turnover costs, by redeploying employees within the organization and providing internal career advancement opportunities, and improving the employer's competitive advantages.

It should also be noted that the personalized search results and search result rankings may be provided in a wide variety of ways; for example, the actual alignment scores for a selected combination of respondents and co-respondents may be provided; or the alignment scores for such a selected combination of respondents and co-respondents may be translated to a different scale (e.g., 5 stars, 4.5 stars, 4 stars, etc.) and provided using other scaled indicators or indicia. For example, in a representative embodiment, such a "star" rating system is utilized and provided (instead of the actual alignment scores) for a selected combination of respondents and co-respondents, as illustrated in the sorted and ranked search result listing 910 of the GUI 900 of FIG. 9A. Also in a representative embodiment, a predetermined number of personalized search results and search result rankings are output in step 450, rather than all such results and rankings. In yet another representative embodiment, a predetermined number of personalized search results and search result rankings are output in step 450, but through a graphical user interface, the respondent or co-respondent is given an option to download and/or view all such results and rankings (e.g., using the ADDITIONAL CANDIDATES button 920 of FIG. 9A).

It should be noted that the output of the personalized search results and search result rankings is generally provided as a listing or list of sorted and ranked respondents or co-respondents. It should be noted that such a listing or list may have any format of any kind, such as sequential, a chart, a sequence of links, etc., for example and without limitation. Any and all such listing or list formats are considered equivalent and within the scope of the disclosure. Similarly, the output of the sorted and ranked respondents or co-respondents means and is a (sorted and ranked) representation or identification of the respondents or co-respondents, such as the name of a respondent or co-respondent, and clearly not the actual human being or company.

As mentioned above, an advantage of user registration, such as by setting up a user profile, is that follow on communication may be established between the respondent and co-respondent entities represented in the personalized search results and search result rankings. For example, as illustrated in the GUI 950 FIG. 9B, by clicking on a Request to Connect button 955, a respondent or co-respondent may contact the other, such as through an email or as a separate communication facilitated via messaging through the server system 200 (such as the client- and server-side communications and/or request messages 655, 660 illustrated in FIG. 6). For example and without limitation, in an employment context, such additional communications may include resumes, job and company descriptions, etc.

Another advantage is the ability to provide locking or "pinning", which can be done by either the respondent or co-respondent to any of the respective co-respondents or respondents on their respective list, such as by clicking on a Request to Connect button 955 of the GUIs 900, 950. Such locking or pinning allows persistence of the selected search result (and potentially also its ranking), such as of Candidate 1 illustrated in the GUI 950, regardless of the additional iterations of the search engine 225 and resulting changes in the personalized and ranked search results, such that the locked or "pinned" selected search result will be maintained in the user's sorted and ranked list 910 even as other search results may be deleted as higher ranked results may arrive. In representative embodiments in which a predetermined number of personalized search results and search result rankings are output in step 450, such locking adds to the predetermined number, and opens up an available slot which may be filled by a higher or lower ranked search result. For example, if seven personalized search results are provided and ranked, pinning of one of the search results will keep the selected result in the list 910, and simultaneously allow entry of an eighth search result to join the list 910. This also underscores the importance of the push notifications with the time-sensitivity of the information returned in the personalized and ranked search results, as an immediate locking of a search result enables additional search results to be provided in additional slots, and further eliminates the possibility that a search result will be removed or "bumped" off the ranked search results (of either the respondent or co-respondent) when additional search results are provided.

As mentioned above, a wide variety of schema or methods are available to generate pair-wise alignment scores for personalized search results and search result rankings. FIG. 5 is a flow diagram illustrating an exemplary or representative method embodiment for pair-wise (or dyadic) score determination for personalization of search results and search result ranking in a search engine. FIG. 10 is a diagram illustrating exemplary or representative responses of respondents and co-respondents to return queries for pair-wise score determination for personalization of search results and search result ranking in a search engine, and is useful to provide examples for the pair-wise score determination (discussed with reference to FIG. 5). Referring to FIG. 10, three return queries are illustrated as question "F" 970, question "G" 975, and question "H" 980, and because the respondent and co-respondent return queries 615, 620 are corollaries, they can be directly compared, as discussed above. For ease of discussion, the various responses are illustrated along the same continuums or scales, with "X" indicating the responses of a co-respondent "D" such as an employer, "0" indicating the responses of a first respondent "Y" (such as a first employment candidate), and "*" (star or asterisk) indicating the responses of a second respondent "Z" (such as a second employment candidate).

As described above with reference to step 430 illustrated in FIG. 4, the scoring generator 235 compares responses of respondents and co-respondents to the preferences, parameters or characteristics provided in the return queries 615, 620, and generates a pair-wise alignment score utilized to provide the personalized search results and search result rankings, iteratively for every relevant respondent and co-respondent combination. Referring to FIG. 5, as part of step 430, the scoring generator 235 starts, step 500, by selecting a relevant respondent and co-respondent combination for determination of the pair-wise alignment score for that combination, step 505. For each such combination, there are generally or typically a plurality of responses to the corresponding pluralities of return queries 615, 620, such as 50 responses each to 50 related return queries 615, 620. The scoring generator 235 selects one set of responses and determines or generates a raw or unmodified "distance" or variance between the responses of the respondent and the responses of the co-respondent, for each related return query 615, 620, and then for the selected respondent and co-respondent combination, their corresponding degree or percentage of alignment, step 510.

Using the examples of FIG. 10, for the DY combination of the co-respondent and first respondent, for the question "F" 970, the unmodified or raw distance between the responses is equal to 1. From the perspective of co-respondent D, the worst response available would have been a +5, a distance of 8, so the first respondent Y only differs by ⅛, generating a degree or percentage of alignment of 87.5% (=1−(⅛)), for question "F" 970. From the perspective of respondent Y, the worst response also would have been a +5, a distance of 7, so the co-respondent D only differs by ⅐, generating a degree or percentage of alignment of 85.7% (=1−(⅐)), for question "F" 970. For the DZ combination of the co-respondent and second respondent, for the question "F" 970, the unmodified or raw distance between the responses is equal to 4. From the perspective of co-respondent D, the worst response would have been a +5, a distance of 8, so the second respondent Z differs by 4/8, generating a degree or percentage of alignment of 50.0% (=1−(4/8)), for question "F" 970. From the perspective of respondent Z, the worst response would have been a −5, a distance of 6, so the co-respondent D differs by 4/6, generating a degree or percentage of alignment of 33.3% (=1−(4/6)), for question "F" 970. Those having skill in the art will recognize that there are innumerable ways to calculate such distances and degrees or percentages of alignment, and all such variations are considered equivalent and within the scope of the present disclosure.

It should be noted that scoring for dichotomous variables, for yes or no responses, will tend to result in 100% alignment or 0% alignment of the responses of the respondent and co-respondent. As such, these responses may be weighted differently, or potentially given no weighting in determining the final alignment scores, for example and without limitation. Other types of responses may also be weighted differently based on user criteria, particularly in employment contexts, such as to flag or increase the visibility of veterans, disable persons, etc., in the personalized search results and search result rankings.

When there are remaining responses for the selected respondent and co-respondent combination, step 515, the scoring generator 235 iterates, returning to step 510 and determines or generates a raw or unmodified distance or variance between the responses of the respondent and co-respondent and their corresponding degree or percentage of alignment for the next set of responses to the return queries 615, 620. Again using the examples of FIG. 10, for the DY combination of the co-respondent and first respondent, for the question "G" 975, the unmodified or raw distance between the responses is equal to 1. From the perspective of co-respondent D, the worst response would have been a −5, a distance of 7, so the first respondent Y only differs by ⅐, generating a degree or percentage of alignment of 85.7% (=1−(⅐)), for question "G" 975. From the perspective of respondent Y, the worst response also would have been a −5, a distance of 8, so the co-respondent D only differs by ⅛, generating a degree or percentage of alignment of 87.5% (=1−(⅛)), for question "G" 975. With the scoring generator 235 iterating again, and again using the examples of FIG. 10, for the DY combination of the co-respondent and first respondent, for the question "H" 980, the unmodified or raw distance between the responses is equal to 1. From the perspective of co-respondent D, the worst response would have been a +5, a distance of 7, so the first respondent Y only differs by ⅐, generating a degree or percentage of alignment of 85.7% (=1−(⅐)), for question "H" 980. From the perspective of respondent Y, the worst response also would have been a +5, a distance of 6, so the co-respondent D only differs by ⅙, generating a degree or percentage of alignment of 83.3% (=1−(⅙)), for question "H" 980.

Next, the scoring generator 235 determines the total raw or unmodified degree of alignment for the selected respondent and co-respondent combination, step 520, which may be, for example, the sum of the individual alignment percentages for all of the responses to the return queries 615, 620, or an average (e.g., mean) value of the individual alignment percentages for all of the responses to the return queries 615, 620. Responses to different return queries 615, 620 may also be differentially weighted in various embodiments.

The scoring generator 235 then determines and generates modified or normalized distances and corresponding modified or normalized degrees or percentages of alignment, using modified or normalized responses, again for the selected respondent and co-respondent combination, step 525, for each response to a return query 615, 620. When there are remaining responses for the selected respondent and co-respondent combination, step 530, the scoring generator 235 iterates, returning to step 525 and determines or generates a modified or normalized distance or variance between the responses of the respondent and co-respondent and their corresponding modified or normalized degree or percentage of alignment for the next set of responses to the return queries 615, 620.

Again referring to the examples of FIG. 10, those having skill in the art will recognize that the responses of the DY combination of the co-respondent and first respondent are highly aligned, differing by a distance equal to one for all responses. In many cases, such differences may be due to mere differences in how various individuals express themselves or use language, e.g., one person's "like" is another person's "love", and one person's "interested" is another person's "very interested", and so on. Accordingly, in the representative embodiments, the scoring generator 235 accounts for these differences by modifying or normalizing the response values and corresponding scales, to then determine modified or normalized distances and the corresponding modified or normalized degrees or percentages of alignment.

There are many modification or normalization methodologies and statistical measures available, such as quantile normalization, cosine similarity (e.g., when the responses are represented as data vectors), feature scaling, etc., for example and without limitation. For example, a difference vector formed by subtracting the co-respondent D's responses from the respondent Y's responses would result in a uniform difference vector of [1, 1, 1] for the example responses illustrated in FIG. 10, indicating a high degree of alignment, while a difference vector formed by subtracting the co-respondent D's responses from the respondent Z's responses would result in a nonuniform difference vector of [4, −3, 4] for the example responses illustrated in FIG. 10, indicating a low degree of alignment. In a representative embodiment, the scoring generator 235 normalizes the distances and degrees of alignment by determining how many "points" were available for responding to the return queries 615, 620, and of those available points, how many points did the respondent or co-respondent actually utilize in responding to the return queries 615, 620. The distance and alignment calculations are then performed again, but using the modified or normalized response values and a correspondingly modified or normalized (expanded) scale, to generate modified or normalized alignment scores for each response to the return queries 615, 620.

Continuing with the examples of FIG. 10, and assuming only three responses to return queries 615, 620 (instead of the more typical higher number, such as 50), the total number of points available for responding to the return queries 615, 620 is equal to fifteen (as an absolute value, a maximum of 5 points in each direction, for 3 questions), and of these, the co-respondent D distributed 7, and the first respondent Y distributed 6. In normalizing the responses, each response value is multiplied by the total number available to distribute divided by the number actually distributed, for each respondent and co-respondent individually; using the examples of FIG. 10, co-respondent D's responses will be multiplied by 15/7, and respondent Y's responses will be multiplied by 15/6. Using a vector notation, co-respondent D's responses of [−3, 2, −2] are now normalized to [−6.43, 4.29, −4.29], and respondent Y's responses of [−2, 3, −1] are now normalized to [5, 7.5, 2.5]. The distance and alignment calculations are then performed again, but using the normalized response values and a correspondingly normalized (expanded) scale, e.g., the scale of −5 to +5 is now expanded to a scale of −15 to +15 (as the cumulative total of the absolute value of endpoints, here, 5+5+5).

As an example of one of the modified or normalized distance calculations, using the examples of FIG. 10, for the DY combination of the co-respondent and first respondent, for the question "F" 970, the normalized distance between the responses is equal to 1.43. From the perspective of co-respondent D, the worst response would have been a +15, a distance of 21.43, so the first respondent Y only differs by 1.43/21.43, generating a degree or percentage of alignment of 93.3% (=1−(1.43/21.43)), for question "F" 970. From the perspective of respondent Y, the worst response also would have been a +15, a distance of 20, so the co-respondent D only differs by 1.43/20, generating a degree or percentage of alignment of 92.9% (=1−(1.43/20)), for question "F" 970. Comparing these to the non-normalized (unmodified or raw) alignment scores now shows the higher degree of alignment, as expected for this combination (for the responses to this return query).

Next, the scoring generator 235 determines the total modified or normalized degree of alignment for the selected respondent and co-respondent combination, step 535, which may be, for example, the sum or weighted sum of the individual normalized alignment percentages for all of the responses to the return queries 615, 620, or an average (e.g., mean) value of the individual normalized alignment percentages for all of the responses to the return queries 615, 620. In a representative embodiment, as an option, the scoring generator 235 then selects a differential weighting for each of the total normalized degree of alignment and the raw or unmodified degree of alignment, step 540. Also in a representative embodiment, for example, the amount of weighting of the total normalized degree of alignment is increased when the raw or unmodified degree of alignment is higher. For example and without limitation, in a representative embodiment: (1) if the raw or unmodified degree of alignment is under 25%, the total modified or normalized degree of alignment is given a zero weighting, so that only the raw or unmodified degree of alignment is utilized in the final alignment score; (2) if the raw or unmodified degree of alignment is between 25% to 50%, the raw or unmodified degree of alignment is given three times the weighting compared to the total normalized degree of alignment (3:1 or ¾ to ¼ weightings) in generating the final alignment score; and (3) if the raw or unmodified degree of alignment is between over 50%, the raw or unmodified degree of alignment is weighted equally with the total modified or normalized degree of alignment (1:1) in generating the final alignment score. Using the differential weighting, if any, the scoring generator 235 combines (e.g., sums) the weighted raw or unmodified degree of alignment and the weighted total normalized degree of alignment, step 545, to produce the pair-wise alignment score for that selected respondent and co-respondent combination. When there are additional respondent and co-respondent combinations, step 550, the scoring generator 235 iterates, returning to step 505 to select the next combination for alignment scoring, and otherwise the method may end, return step 555.

Figure 11A:
Figure 12:
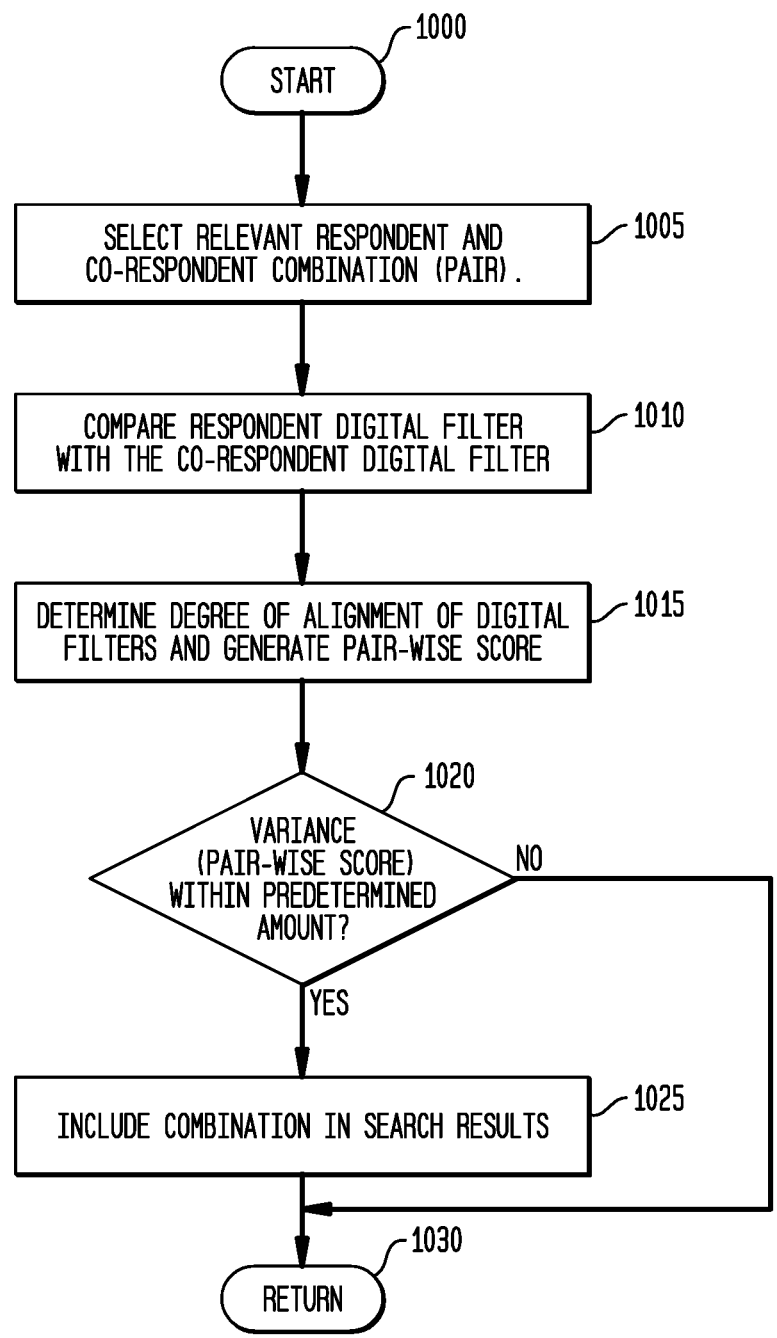
FIG. 12 is a flow diagram illustrating an exemplary or representative method embodiment for pair-wise alignment score determination using customized digital filters for customized filtering and/or personalization of search results and search result ranking in a search engine.

FIG. 11 illustrates respondent and co-respondent customized digital filters, represented both as matrices (e.g., 350, 360, 370) in FIGS. 11A, 11B) and vectors (e.g., $350_A$, $360_A$, $370_A$) in FIG. 11C), and with corresponding difference vectors (FIGS. 11D and 11E). FIG. 12 is a flow diagram illustrating an exemplary or representative method embodiment for pair-wise alignment score determination using customized digital filters for customized filtering and/or personalization of search results and search result ranking in a search engine. These customized digital filters provide two-stage or bilateral filtering for generation of highly personalized search results and search result rankings, with personalized search results and search result rankings returned to the user for information (e.g., the respondent and co-respondent as represented by the respondent and co-respondent customized digital filters (350, 360, 370, $350_A$, $360_A$, $370_A$) which meets the requirements, within a predetermined variance, of both respondent and co-respondent customized digital filters (350, 360, 370, $350_A$, $360_A$, $370_A$), i.e., the information "passes through" both the respondent and co-respondent customized digital filters (350, 360, 370, $350_A$, $360_A$, $370_A$), as respective first and second filter stages.

In addition, using the respondent and co-respondent customized digital filters (350, 360, 370, $350_A$, $360_A$, $370_A$) provides for an increased speed of searching, as any selected respondent and co-respondent combination or pair of customized digital filters (350, 360, 370, $350_A$, $360_A$, $370_A$) may be rapidly overlaid or compared with each other, and when the respondent and co-respondent combination of customized digital filters are aligned or match within a predetermined variance, the information is included in the personalized search results and search result rankings for the respondent and co-respondent. Using the respondent and co-respondent customized digital filters (350, 360, 370, $350_A$, $360_A$, $370_A$) also decreases the amount of data needed to be stored in memory 205 or in a database 220, and further serves to simplify the database structure, which can be represented, for example, by a column number representing a selected return query 615, 620 and a response value, as illustrated.

Each of the respondent and co-respondent customized digital filters (350, 360, 370, $350_A$, $360_A$, $370_A$) are populated, as a matrix (e.g., 350, 360, 370) or as a vector (e.g., $350_A$, $360_A$, $370_A$), for example, with the user's (respondent or co-respondent) responses to the return queries 615, 620, which may be raw (unmodified) or modified (e.g., normalized) data. As represented by the matrices (e.g., 350, 360, 370), the user responses to the return queries 615, 620 are represented positionally in the customized digital filters, with the column indicating a selected return query 615, 620, and a "1" in a row indicating the response to the selected return query 615, 620, such as the first column of matrix 350 indicating a response of "4" out of 5 possible responses, the second column of matrix 350 indicating a response of "1" out of 5 possible responses, the third column of matrix 350 indicating a response of "2" out of 5 possible responses, and so on. The user's (respondent or co-respondent) responses to the return queries 615, 620 are represented equivalently by the customized digital filter illustrated in a vector form as vector $350_A$, with each row representing the response to a return query 615, 620.

Referring to FIG. 12, as part of step 430, the scoring generator 235 starts, step 1000, by selecting a relevant respondent and co-respondent combination for determination of the pair-wise alignment score for that combination, step 1005. Next, in step 1010, the scoring generator 235 compares the respondent and co-respondent customized digital filters 350, $350_A$ (or 370, $370_A$) and 360, $360_A$, and in step 1015, determines the degree of alignment of the selected digital filters and generates a corresponding pair-wise score, as discussed above. As an additional embodiment, the degree of alignment may be based on determination of a variance between the digital filters, and if the variance is within a predetermined amount, level or threshold, step 1020, search results are returned which include the respondent and co-respondent combination, step 1025, and otherwise not returned to the user. Following step 1020 or 1025, the method may end, return step 1030.

Comparing the respondent and co-respondent customized digital filters 350, $350_A$ and 360, $360_A$, it can be rapidly determined that they are highly aligned, differing only by one value in the respective last columns (a "5" versus a "4") or last row of vectors $350_A$, $360_A$. This comparison may be accomplished quite rapidly, such as by determination of a difference matrix or vector, which in this case would show a difference of only a value of one for one response to a return query 615, 620, as illustrated in difference vector $380_A$ of FIG. 11D.

The rapid comparison of the respondent and co-respondent customized digital filters 350 and 360 indicates a high degree of alignment, and depending upon the amount of predetermined variance selected by the user, would indicate that the information represented by the customized digital filters (350, 360, $350_A$, $360_A$) should be provided in the personalized search results and search result rankings, such as an employment opportunity conveyed to an employment candidate and the candidate information conveyed to a potential employer, respectively, as the respondent and co-respondent pair or combination.

Similarly, comparing the respondent and co-respondent customized digital filters 370 and 360, it can be rapidly determined that they are also highly aligned when normalized or modified, as each response to a return query 615, 620 of customized digital filter 370 is shifted only by one value, and when shifted, exhibit complete alignment. This comparison also may be accomplished quite rapidly, also such as by determination of a difference matrix or vector, which in this case would show a consistent difference of a value of one for all responses to return queries 615, 620, as illustrated in difference vector $390_A$ of FIG. 11E. The rapid comparison of the respondent and co-respondent customized digital filters 370 and 360 indicates a high degree of alignment, and depending upon the amount of predetermined variance selected by the user, would also indicate that the information represented by the customized digital filters (370, 360, $370_A$, $360_A$) should be provided in the personalized search results and search result rankings, such as an employment opportunity conveyed to an employment candidate and the candidate information conveyed to a potential employer, respectively, as the respondent and co-respondent pair or combination.

It should be noted that this two-stage filtering is highly new and novel. One (first) stage of the filtering is user-customizable, based upon the user's (respondent or co-respondent) responses to the return queries 615, 620. The second stage of filtering, however, is customizable by a third party, namely, another respondent or co-respondent whose information may or may not be returned to the user in the user's personalized network search results and search result rankings, depending upon the alignment between the user's digital filter and the third party's digital filter.

In a representative embodiment, the one or more processors may be further adapted to use the plurality of digital filters (350, 360, 370, $350_A$, $360_A$, $370_A$) to provide a two-stage filtering of potential search results through both a respondent digital filter of a selected respondent and a co-respondent digital filter of a selected co-respondent, of the plurality of digital filters (350, 360, 370, 350$_A$, 360$_A$, 370$_A$), to generate the personalized network search results and search result rankings for the selected respondent or the selected co-respondent. For example, a first co-respondent may be included in the personalized network search results and search result rankings returned to the selected respondent when the information pertaining to the first co-respondent meets the requirements, within a predetermined variance or difference, of both the co-respondent digital filter of the first co-respondent, as a first stage of filtering, and the respondent digital filter of the selected respondent, as a second stage of filtering. Similarly, also for example, a first respondent may be included in the personalized network search results and search result rankings returned to the selected co-respondent when the information pertaining to the first respondent meets the requirements, within a predetermined variance or difference, of both the respondent digital filter of the first respondent, as a first stage of filtering, and the co-respondent digital filter of the selected co-respondent, as a second stage of filtering.

In summary, the representative embodiments provide a technical, artificial intelligence solution to an Internet-centric problem of over-inclusiveness and under-inclusiveness of search results and distorted rankings of search results using the prior art keyword searching. The representative embodiments automate the Internet-based searching and selection processes using highly relevant, user-determined characteristics and user-customizable parameters, resulting in personalization of search results and search result ranking. The representative embodiments employ artificial intelligence to "match" information to a user (as a respondent or co-respondent) and provide with greater precision the information the user wants or needs (if available) at the point in time wanted or needed, without inundating the user with thousands of responses or documents which the user cannot possibly review in a reasonable or allocated time.

As a result, the representative embodiments improve the functioning of Internet-based searches, providing highly personalized search results and search result rankings, thereby dramatically decreasing the amount of search time required for a user to discover relevant and actionable information.

The representative embodiments have particular advantages in various contexts, such as employment searching. The representative embodiments enable personalization of search results and search result rankings, for both an employment candidate and a potential employer, with dramatic time savings and with much more highly relevant results. The representative embodiments also enable "blind" searching, without regard to race, religion, gender, ethnicity (which may be apparent in a candidate's name, for example), age, and so on, which is highly relevant for legal compliance and documentation. The personalized search results and search result rankings may also be useful in other ways, such as indicating to an employer other avenues for recruiting, such as postings on additional sites that also can feed into the server system 200. Dashboards may also be created for various contexts, such as for universities, who may then see how their graduates are doing in the job market.

It should be noted that the representative embodiments provide a technical solution to a technical, Internet-centric problem of over-inclusiveness of search results and distorted rankings of search results using the prior art keyword searching. For example, in the employment context, this problem did not exist in the pre-Internet age, and a company would not receive hundreds of thousands of candidate resumes each year. Rather, a company having an employment opening or looking to hire potential candidates typically provided physical, print advertisements in local newspapers, technical and professional journals, or hosted or participated in multi-employer job fairs, for example, with a potential candidate seeing the advertisement or attending the job fair and applying for the position, resulting in the company receiving 10-100 candidate resumes in response, also for example, which could all be reviewed in a comparatively short period of time.

Similarly, the representative embodiments are also necessarily technical and improve the functioning of the Internet and networked computing devices as a whole, providing an artificial intelligence solution to this Internet-centric problem by enabling personalization of search results and search result ranking.

Lastly, it should also be noted that the representative embodiments cannot merely be performed by hand or in the human mind. As mentioned above, using conservative estimates, it would not be unusual for 100,000 candidates worldwide to be seeking new employment opportunities and for employers to be seeking to fill 100,000 employment opportunities worldwide (and in the aggregate). To score 100,000 candidates across potentially 100,000 employment opportunities would result in 10 billion possible combinations, with scoring across responses to 50 return queries 615, 620 resulting in 500 billion comparisons. Assuming a highly capable person could perform each comparison in 30 seconds (2/minute), would then take 250 billion minutes, translating to over 4.167 billion hours, and for an eight hour work day per person, consume 520,833,333 person-days, or stated more simply, would take 1,426,940 person-years, which are clearly not available when trying to fill a position in the next month or two! Even much more conservative estimates of the number of candidates to be scored for employment opportunities, such as 10,000 candidates across potentially 10,000 employment opportunities would result in 100 million possible combinations, with scoring across responses to 50 return queries 615, 620 resulting in 5 billion comparisons. Again assuming a highly capable person who could perform each comparison in 30 seconds (2/minute), would then take 2.5 billion minutes, translating to over 41 million hours, and for an eight hour work day per person, consume 5,208,333 person-days, or stated more simply, would take 14,269 person-years, which is an equally insurmountable task for time-sensitive information and requirements.

As used herein, a processor 210, 305 (and, for the processor 210, its incorporated return query generator 230, scoring generator 235, ranking generator 240, and rank modification generator 245) may be implemented using any type of digital or analog electronic or other circuitry which is arranged, configured, designed, programmed or otherwise adapted to perform any portion of the personalization of search results and search result rankings functionality, described herein. As the term processor is used herein, a processor 210, 305 may include use of a single integrated circuit ("IC"), or may include use of a plurality of integrated circuits or other electronic components connected, arranged or grouped together, such as processors, controllers, microprocessors, digital signal processors ("DSPs"), parallel processors, multiple core processors, custom ICs, application specific integrated circuits ("ASICs"), field programmable gate arrays ("FPGAs"), adaptive computing ICs, discrete electronic components, and any associated memory (such as RAM, DRAM and ROM), and other ICs and components, whether analog or digital. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits or discrete electronic components which perform the functions discussed above and further discussed below, and may further include any associated memory, such as microprocessor memory or additional RAM, DRAM, SDRAM, SRAM, MRAM, ROM, FLASH, EPROM or EPROM. A processor (such as processor 210, 305), with any associated memory, may be arranged, adapted or configured (via programming, FPGA interconnection, or hard-wiring) to perform any portion of the personalization of search results and search result rankings of the present disclosure, as described herein. For example, the methodology may be programmed and stored, in a processor 210, 305 with its associated memory (and/or memory 205, 310, respectively) and other equivalent components, as a set of program instructions or other code (or equivalent configuration or other program) for subsequent execution when the processor 210, 305 is operative (i.e., powered on and functioning). Equivalently, when the processor 210, 305 may implemented in whole or part as FPGAs, custom ICs and/or ASICs, the FPGAs, custom ICs or ASICs also may be designed, configured and/or hard-wired to implement any portion of the personalization of search results and search result rankings of the present disclosure. For example, the processor 210, 305 may be implemented as an arrangement of analog and/or digital circuits, controllers, microprocessors, DSPs and/or ASICs, collectively referred to as a "processor", which are respectively hard-wired, arranged, programmed, designed, adapted or configured to implement personalization of search results and search result rankings of the present disclosure, including possibly in conjunction with a memory 205, 310.

The operations described in this disclosure can be implemented as operations performed by a data processing apparatus on data stored on one or more machine-readable storage devices or on data received from other sources. Server system 200 is an example of a representative data processing apparatus. As utilized herein, the terminology "data processing apparatus" encompasses any and all kinds of apparatus, devices, and machines for processing data, including by way of example a programmable processor (210, 305), a computer, a server, a system on a chip ("SOC"), or combinations of such devices. The server system 200 can also include code (such as executable code) that creates an execution environment for a data processing apparatus, or other program, such as processor 210 firmware, a protocol stack, a database (220, 220A) management system, an operating system, a cross-platform runtime environment, a virtual machine, and/or combinations thereof, which may be utilized in a computer, a server 200, or other data processing apparatus.

A memory 205, 310 and/or a data storage device 250 may be embodied as any type of data storage device, such as RAM, FLASH, DRAM, SDRAM, SRAM, MRAM, FeRAM, ROM, EPROM or $E^2$PROM, and is utilized for data storage, and also may be utilized to store any program instructions or configurations which may be utilized by a processor 210, 305. More specifically, the memory 205, 310 and/or a data storage device 250 may be embodied in any number of forms, including within any nontransitory, machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 210, 305 or processor IC), whether volatile or non-volatile, whether removable or non-removable, including without limitation RAM, FLASH, DRAM, SDRAM, SRAM, MRAM, FeRAM, ROM, EPROM or $E^2$PROM, or any other form of memory or data storage device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 205, 310 and/or a data storage device 250 may store data in any way or configuration, including as various look up tables, parameters, coefficients, databases, other information and data, programs or instructions (of the software of the present invention), and other types of tables such as database tables or any other form of data repository.

The network interface (I/O) circuits 215, 315 may be implemented as known or may become known in the art, and may include impedance matching capability, voltage rectification circuitry, voltage translation for a low voltage processor to interface with a higher voltage control bus for example, various switching mechanisms (e.g., transistors) to turn various lines or connectors on or off in response to signaling from a processor 210, 305, other control logic circuitry, and/or physical coupling mechanisms. In addition, the network interface (I/O) circuits 215, 315 are also adapted to receive and/or transmit signals externally to the server system 200 and client device 300, 300A, respectively, such as through hard-wiring or RF signaling, for example, to receive and transmit information in real-time, such as queries 605, 610, return queries 615, 620, and personalized search results and search result rankings, also for example. The network interface (I/O) circuits 215, 315 also may be stand-alone devices (e.g., modular). The network interface (I/O) circuits 215, 315 are utilized for appropriate connection to a relevant channel, network or bus; for example, the network interface (I/O) circuits 215, 315 may provide impedance matching, drivers and other functions for a wireline interface, may provide demodulation and analog to digital conversion for a wireless interface, and may provide a physical interface for the memory 205, 310 with other devices. In general, the network interface (I/O) circuits 215, 315 are used to receive and transmit data, depending upon the selected embodiment, such as queries 605, 610, return queries 615, 620, and personalized search results and search result rankings, control messages, authentication data, profile information, and other pertinent information.

As indicated above, the processor 210, 305 is hard-wired, configured or programmed, using software and data structures of the invention, for example, to perform any portion of the automated personalization of search results and search result rankings, of the present disclosure. As a consequence, the system and method of the present disclosure may be embodied as software which provides such programming or other instructions, such as a set of instructions and/or metadata embodied within a nontransitory computer-readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Javascript, Adobe Flash, Silverlight, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, "software", "program", "computer program", or a "module", "program module", "software module", as used equivalently herein, means and refers to any programming language, of any kind, with any syntax or signatures, which provides or can be interpreted to provide the associated functionality or methodology specified (when instantiated or loaded into a processor or computer and executed, including the processor 210, 305, for example). In addition, any of such program or software modules may be combined or divided in any way. For example, a larger module combining first and second functions is considered equivalent to a first module which performs the first function and a separate second module which performs the second function.

For example, a computer program (e.g., a program, software, software application, script, or code) can be written in any form of programming language, including compiled, interpreted, declarative, or procedural languages. Such a program may be implemented in any form, including as a stand-alone program or as a module, component, subroutine, object, or other construct which may be used in a computing environment, and may be stored as a file, a file system, multiple files, or portion of a file which includes other programs or data, such as a script stored in a markup language document, and may be executed on one or more computers, servers 200, or other data processing apparatus that are co-located or distributed across multiple locations and interconnected by a network such as network or internet 110.

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 205, 310, e.g., a memory IC, a floppy disk, a CDROM, a CD-RW, a DVD, a magnetic hard drive, an optical drive, or any other type of data storage apparatus or medium, as mentioned above.

In addition to the server system 200 illustrated in FIG. 2, those having skill in the art will recognize that there are innumerable equivalent configurations, layouts, kinds and types of server and control circuitry known in the art, which are within the scope of the present invention.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. One having skill in the art will further recognize that additional or equivalent method steps may be utilized, or may be combined with other steps, or may be performed in different orders, any and all of which are within the scope of the claimed invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A computation system coupleable to a network for personalization of employment search results and search result rankings, the computation system comprising:
    a network input and output interface configured to transmit and receive network data, the network input and output interface further configured to receive at least one query from a respondent or a co-respondent via the network, the at least one query pertaining to employment; to transmit a plurality of return queries to the respondent or co-respondent via the network; to receive a plurality of responses to the plurality of return queries from the respondent or co-respondent via the network; and to transmit personalized employment search results and search result rankings to the respondent or co-respondent via the network;
    at least one data storage device configured to store the plurality of return queries; and
    one or more processors coupled to the at least one data storage device and to the network input and output interface, the one or more processors configured to access the at least one data storage device and using the at least one query, to select the plurality of return queries pertaining to employment for transmission; to search the at least one data storage device for corresponding pluralities of responses to the plurality of return queries from one or more co-respondents or respondents, respectively; to comparatively pair-wise score the plurality of responses to the plurality of return queries against the corresponding pluralities of responses to the plurality of return queries and generate a plurality of pair-wise alignment scores for a plurality of respondent and co-respondent combinations; to sort and rank the plurality of respondent and co-respondent combinations according to the plurality of pair-wise alignment scores; and the one or more processors further configured to use the sorted and ranked plurality of respondents or co-respondents combinations to generate and output the personalized employment search results and search result rankings, the personalized employment search results and search result rankings comprising one or more identifications of sorted and ranked respondents or co-respondents for the co-respondent or respondent, respectively.

2. The computation system of claim 1, wherein the one or more processors are further configured to select one or more co-respondents or respondents from the sorted and ranked plurality of respondent and co-respondent combinations for inclusion of a predetermined number of sorted and ranked respondents or co-respondents in the personalized employment search results and search result rankings.

3. The computation system of claim 1, wherein the one or more processors are further configured, for each response of the plurality of responses to the plurality of return queries, to determine an unmodified distance between responses of a respondent and a co-respondent; and to combine a plurality of unmodified distance determinations for the plurality of responses to the plurality of return queries to form an unmodified alignment score.

4. The computation system of claim 3, wherein the one or more processors are further configured, for each response of the plurality of responses to the plurality of return queries, to determine a normalized distance between each response of a respondent and a co-respondent; and to combine a plurality of normalized distance determinations for the plurality of responses to the plurality of return queries to form a normalized alignment score.

5. The computation system of claim 4, wherein the one or more processors are further configured to differentially weight the unmodified alignment score and normalized alignment score; and to combine the differentially weighted unmodified alignment score and normalized alignment score to form a pair-wise alignment score of the plurality of pair-wise alignment scores.

6. The computation system of claim 1, wherein the one or more processors are further configured to generate a digital filter from the plurality of responses to the plurality of return queries to form a plurality of digital filters, wherein each digital filter of the plurality of digital filters comprises a matrix or vector having the plurality of responses to the plurality of return queries for a selected respondent or co-respondent.

7. The computation system of claim 6, wherein the one or more processors are further configured to compare, using a variance determination or a difference determination, a selected combination of respondent and co-respondent digital filters, of the plurality of digital filters, to generate a pair-wise alignment score, of the plurality of pair-wise alignment scores, for the selected respondent and co-respondent combination.

8. The computation system of claim 6, wherein the one or more processors are further configured to use the plurality of digital filters to provide a two-stage filtering of potential search results through both a respondent digital filter of a selected respondent and a co-respondent digital filter of a selected co-respondent, of the plurality of digital filters, to generate the personalized employment search results and search result rankings for the selected respondent or the selected co-respondent.

9. The computation system of claim 1, wherein the one or more processors are further configured to store the plurality of pair-wise alignment scores for the plurality of respondent and co-respondent combinations in the at least one data storage device, and wherein the one or more processors are further configured to store the one or more identifications of the sorted and ranked respondents or co-respondents in the at least one data storage device.

10. The computation system of claim 1, wherein at least one return query of the plurality of return queries to the respondent or co-respondent pertains to a commute time or pertains to access to transportation.

11. The computation system of claim 1, wherein the one or more processors are further configured to filter the one or more identifications of the sorted and ranked respondents or co-respondents using a user-selectable parameter, of a plurality of user-selectable parameters, selected from the group consisting of: a previous employer, a current employer, a previous employee, a current employee, citizenship, a disability status, a visa status, military service, a commute time, access to transportation, a geographic location, and combinations thereof.

12. The computation system of claim 1, wherein the one or more identifications of the sorted and ranked respondents or co-respondents comprises one or more identifications of sorted and ranked employment candidates provided to a potential employer or comprises one or more identifications of sorted and ranked potential employers provided to an employment candidate.

13. The computation system of claim 1, wherein each return query a first plurality of return queries to the respondent is a corollary to each return query of a second plurality of return queries to the co-respondent.

14. The computation system of claim 1, wherein each return query of the plurality of return queries to a respondent pertains to a preference or interest level of one or more characteristics of the at least one query.

15. A computer system-implemented method for network search and personalization of employment search results and search result rankings, the computer system comprising a network input and output interface, at least one data storage device, and one or more processors coupled to the at least one data storage device and to the network input and output interface, the method comprising:
  using the network input and output interface, receiving at least one query from an employment candidate as respondent or a potential employer as a co-respondent via the network, the at least one query pertaining to employment;
  in response to the at least one query, using the one or more processors, accessing the at least one data storage device and selecting a plurality of return queries pertaining to one or more characteristics or features of an employment position, and at least one return query of the plurality of return queries pertaining to a commute time or access to transportation;
  using the network input and output interface, transmitting the plurality of return queries to the respondent or co-respondent via the network;
  using the network input and output interface, receiving a plurality of responses to the return queries from the respondent or co-respondent via the network;
  using the one or more processors, searching the at least one data storage device for corresponding pluralities of responses to the plurality of return queries from one or more co-respondents or respondents, respectively;
  using the one or more processors, comparatively pair-wise scoring the plurality of responses to the plurality of return queries against the corresponding pluralities of responses to the plurality of return queries and generating a plurality of pair-wise alignment scores for a plurality of respondent and co-respondent combinations;
  using the one or more processors, sorting and ranking the plurality of respondent and co-respondent combinations according to the plurality of pair-wise alignment scores;
  using the one or more processors, from the sorted and ranked plurality of respondent and co-respondent combinations, generating the personalized employment search results and search result rankings, the personalized employment search results and search result rankings comprising one or more identifications of sorted and ranked respondents or co-respondents for the co-respondent or respondent, respectively; and
  using the network input and output interface, transmitting the personalized employment search results and search result rankings.

16. The computer system-implemented method of claim 15, further comprising:
  using the one or more processors, selecting one or more co-respondents or respondents from the sorted and ranked plurality of respondent and co-respondent combinations for inclusion of a predetermined number of sorted and ranked respondents or co-respondents in the personalized network search results and search result rankings.

17. The computer system-implemented method of claim 15, wherein the pair-wise scoring further comprises:
  for each response of the plurality of responses to the plurality of return queries, using the one or more processors, determining an unmodified distance between each response of a respondent and a co-respondent; and
  using the one or more processors, combining a plurality of unmodified distance determinations for the plurality of responses to the plurality of return queries to form an unmodified alignment score;
  for each response of the plurality of responses to the plurality of return queries, using the one or more processors, determining a normalized distance between each response of a respondent and a co-respondent; and
  using the one or more processors, combining a plurality of normalized distance determinations for the plurality of responses to the plurality of return queries to form a normalized alignment score;
  using the one or more processors, differentially weighting the unmodified alignment score and normalized alignment score; and
  using the one or more processors, combining the differentially weighted unmodified alignment score and normalized alignment score to form each pair-wise alignment score of the plurality of pair-wise alignment scores.

18. The computer system-implemented method of claim 15, further comprising:
  using the one or more processors, generating a digital filter from the e plurality of responses to the plurality of return queries to form a plurality of digital filters, wherein each digital filter of the plurality of digital filters comprises a matrix or vector having the plurality of responses to the plurality of return queries for a selected respondent or co-respondent; and
  using the one or more processors, comparing a selected combination of respondent and co-respondent digital filters, of the plurality of digital filters, to generate a pair-wise alignment score for the selected respondent and co-respondent combination, of the plurality of pair-wise alignment scores, wherein the comparison is a variance determination or a difference determination.

19. The computer system-implemented method of claim 15, further comprising:
using the one or more processors, storing the plurality of pair-wise alignment scores for the plurality of respondent and co-respondent combinations in the at least one data storage device; and
using the one or more processors, storing the one or more identifications of the sorted and ranked respondents or co-respondents in the at least one data storage device.

20. The computer system-implemented method of claim 15, further comprising:
using the one or more processors, filtering the one or more identifications of the sorted and ranked respondents or co-respondents using a user-selectable parameter, of a plurality of user-selectable parameters, selected from the group consisting of: a previous employer, a current employer, a previous employee, a current employee, citizenship, a disability status, a visa status, military service, a commute time, access to transportation, a geographic location, and combinations thereof.

21. The computer system-implemented method of claim 15, wherein the one or more identifications of the sorted and ranked respondents or co-respondents comprises one or more identifications of sorted and ranked employment candidates provided to a potential employer or comprises one or more identifications of sorted and ranked potential employers provided to an employment candidate.

22. A computation system coupleable to a network for personalization of employment search results and search result rankings, the computation system comprising:
a network input and output interface configured to transmit and receive network data, the network input and output interface further configured to receive, via the network, at least one query from an employment candidate as a respondent or a potential employer as a co-respondent; to transmit a plurality of return queries to the respondent or co-respondent via the network; to receive a plurality of responses to the plurality of return queries from the respondent or co-respondent via the network; and to transmit personalized employment search results and search result rankings to the respondent or co-respondent via the network;
at least one data storage device configured to store the plurality of return queries; and
one or more processors coupled to the at least one data storage device and to the network input and output interface, the one or more processors configured to access the at least one data storage device and using the at least one query, to select the plurality of return queries for transmission, the plurality of return queries pertaining to one or more characteristics or features of an employment position, and at least one return query of the plurality of return queries pertaining to a commute time or access to transportation; to search the at least one data storage device for corresponding pluralities of responses to the plurality of return queries from one or more co-respondents or respondents, respectively; to comparatively pair-wise score the plurality of responses to the plurality of return queries against the corresponding pluralities of responses to the return queries using differentially weighted unmodified alignment scores and normalized alignment scores and generate a plurality of pair-wise alignment scores for a plurality of respondent and co-respondent combinations; to sort and rank the plurality of respondent and co-respondent combinations according to the plurality of pair-wise alignment scores; the one or more processors further configured to use the sorted and ranked plurality of respondents or co-respondents combinations to generate and output the personalized employment search results and search result rankings, the personalized employment search results and search result rankings comprising one or more identifications of sorted and ranked respondents or co-respondents for the co-respondent or respondent, respectively.

* * * * *